US00RE43315E

(19) United States
(12) Reissued Patent
Ziemer

(10) Patent Number: US RE43,315 E
(45) Date of Reissued Patent: Apr. 17, 2012

(54) MULTI-STEP GEAR

(75) Inventor: Peter Ziemer, Tettnang (DE)

(73) Assignee: ZF Friedrichshafen AG, Friedrichshafen (DE)

(21) Appl. No.: 11/529,692

(22) Filed: Sep. 28, 2006

Related U.S. Patent Documents

Reissue of:
(64) Patent No.: 6,634,980
Issued: Oct. 21, 2003
Appl. No.: 10/089,808
PCT Filed: Oct. 11, 2000
PCT No.: PCT/EP00/09993
§ 371 (c)(1),
(2), (4) Date: Apr. 3, 2002
PCT Pub. No.: WO01/27496
PCT Pub. Date: Apr. 19, 2001

(30) Foreign Application Priority Data

Oct. 14, 1999 (DE) ..... 199 49 507

(51) Int. Cl.
*F16H 3/62* (2006.01)
(52) U.S. Cl. ..... 475/275
(58) Field of Classification Search ..... None
See application file for complete search history.

(56) References Cited

U.S. PATENT DOCUMENTS

| | | | | |
|---|---|---|---|---|
| 3,400,609 | A | 9/1968 | Utter | |
| 4,345,490 | A * | 8/1982 | Madson | 475/277 |
| 4,823,641 | A | 4/1989 | Kuhn et al. | |
| 4,860,613 | A * | 8/1989 | Hall, III et al. | 475/23 |
| 5,098,357 | A * | 3/1992 | Asada et al. | 475/278 |
| 5,106,352 | A | 4/1992 | Lepelletier | 475/280 |
| 5,342,257 | A | 8/1994 | Hotta et al. | 475/275 |
| 5,342,258 | A | 8/1994 | Egyed | 475/281 |
| 6,425,841 | B1 * | 7/2002 | Haka | 475/275 |
| 6,514,170 | B1 * | 2/2003 | Kao et al. | 475/296 |
| 6,709,358 | B2 * | 3/2004 | Raghavan et al. | 475/275 |
| 2002/0142880 | A1 * | 10/2002 | Hayabuchi et al. | 475/275 |
| 2003/0060323 | A1 * | 3/2003 | Kao et al. | 475/296 |

FOREIGN PATENT DOCUMENTS

| | | |
|---|---|---|
| EP | 0 371 651 A2 | 6/1990 |
| EP | 0 433 619 A2 | 6/1991 |
| EP | 0 434 525 A1 | 6/1991 |
| EP | 0 997 663 A2 | 5/2000 |
| GB | 2 103 736 A | 2/1983 |
| WO | 86/06808 | 11/1986 |

* cited by examiner

*Primary Examiner* — Sherry Estremsky
(74) *Attorney, Agent, or Firm* — Davis & Bujold, P.L.L.C.

(57) ABSTRACT

The invention concerns a multi-step transmission with at least 7 forward gears, with which transmission on the input drive shaft (1), two non-shiftable input-side gear sets (RS1, RS2) are provided, which, on their output-side produce two speeds of rotation (n1, n2), which, besides the speed of rotation of the input drive shaft (1), by selective closure of the shift elements (A, B, C, D, E) are shiftable in such a manner to one of the output-side planetary gear sets (RS3, RS4) which upon the output drive shafts (2), that for the shifting from one into the respective next following higher or lower gear of the two activated shift elements, respectively, only one shifting element must be open and a further element closed.

12 Claims, 16 Drawing Sheets

CLOSED SHIFT ELEMENTS

| GEAR | SHIFT ELEMENT A | B | C | D | E | GEAR RATIO | GEAR RANGE (SPREAD 9.15) |
|---|---|---|---|---|---|---|---|
| 1 | | | o | o | | 7.23 | 1.86 |
| 2 | o | | | o | | 3.88 | 1.41 |
| 3 | o | | o | | | 2.75 | 1.65 |
| 4 | o | o | | | | 1.67 | 1.31 |
| 5 | o | | | | o | 1.27 | 1.27 |
| 6 | | o | | | o | 1 | 1.26 |
| 7 | | | o | | o | 0.79 | |
| R | | o | | o | | -7.88 | |

STALL RATIO

IO(RS3) = -2.0
IO(RS4) = -2.4
IO(RS1) = -1.75
IO(RS2) = -4.0

CLOSED SHIFT ELEMENTS

| GEAR | SHIFT ELEMENT A | B | C | D | E | GEAR RATIO | GEAR RANGE (SPREAD 9.0) |
|---|---|---|---|---|---|---|---|
| 1 | | | o | o | | 6.00 | 1.86 |
| 2 | o | | | o | | 3.25 | 1.41 |
| 3 | o | | o | | | 2.17 | 1.65 |
| 4 | o | o | | | | 1.32 | 1.31 |
| 5 | o | | | | o | 1 | 1.27 |
| 6 | | o | | | o | 0.82 | 1.26 |
| 7 | | | o | | o | 0.67 | |
| R | | o | | o | | -9.00 | |

STALL RATIOS

IO(RS3) = -2.25
IO(RS4) = -3.0
IO(RS1) = -2.0
IO(RS2) = -2.0

CLOSED SHIFT ELEMENTS

| GEAR | SHIFT ELEMENT A | B | C | D | E | GEAR RATIO | GEAR RANGE (SPREAD 9.0) |
|---|---|---|---|---|---|---|---|
| 1 | | | o | o | | 6.00 | 1.86 |
| 2 | o | | | o | | 3.25 | 1.50 |
| 3 | o | | o | | | 2.17 | 1.65 |
| 4 | o | o | | | | 1.32 | 1.32 |
| 5 | o | | | | o | 1 | 1.22 |
| 6 | | o | | | o | 0.82 | 1.22 |
| 7 | | | o | | o | 0.67 | |
| R | | o | | o | | -9.00 | |

STALL RATIOS

IO(RS3) = +3.25
IO(RS4) = -3.0
IO(RS1) = -2.0
IO(RS2) = +2.5

CLOSED SHIFT ELEMENTS

| GEAR | SHIFT ELEMENTS A | B | C | D | E | GEAR RATIO | GEAR RANGE (SPREAD 10.2) |
|---|---|---|---|---|---|---|---|
| 1 | | | ○ | ○ | | 8.3 | 2.08 |
| 2 | ○ | | | ○ | | 4.0 | 1.43 |
| 3 | ○ | | ○ | | | 2.8 | 1.53 |
| 4 | ○ | ○ | | | | 1.83 | 1.38 |
| 5 | ○ | | | | ○ | 1.33 | 1.33 |
| 6 | | ○ | | | ○ | 1 | 1.23 |
| 7 | | | ○ | | ○ | 0.81 | |
| R | | ○ | | ○ | | −8.6 | |

STALL RATIOS

I0(RS3) = −3.0
I0(RS4) = −2.7
I0(RS1) = −1.86
12/22 = +1.7

CLOSED SHIFT ELEMENTS

| GEAR | SHIFT ELEMENT A | B | C | D | E | GEAR RATIO | GEAR RANGE (SPREAD 15) |
|---|---|---|---|---|---|---|---|
| 1 | | | o | o | | 10.0 | 2.79 |
| 2 | o | | | o | | 3.59 | 1.62 |
| 3 | o | | o | | | 2.15 | 1.46 |
| 4 | o | o | | | | 1.47 | 1.47 |
| 5 | o | | | | o | 1 | 1.32 |
| 6 | | o | | | o | 0.76 | 1.15 |
| 7 | | | o | | o | 0.66 | |
| R | | o | | o | | -9.37 | |

STALL RATIOS

IO(RS3) = -3.39
IO(RS4) = -2.27
IO(RS1) = -1.5
IO(RS2) = -1.8

CLOSED SHIFT ELEMENTS

| GEAR | SHIFT ELEMENT A | B | C | D | E | F |
|---|---|---|---|---|---|---|
| 1 | | | | o | | o |
| 2 | | | o | o | | |
| 3 | o | | | o | | |
| 4 | o | | o | | | |
| 5 | o | | | | | o |
| 6 | o | o | | | | |
| 7 | o | | | | o | |
| 8 | | o | | | o | |
| 9 | | | | | o | o |
| 10 | | | o | | o | |
| R | | o | | o | | |

STALL RATIOS

IO(RS3) = +2.6
IO(RS4) = −2.0
IO(RS1) = −2.3
IO(RS2) = −1.8

CLOSED SHIFT ELEMENTS

| GEAR | SHIFT ELEMENT A | B | C | D | E | F |
|---|---|---|---|---|---|---|
| 1 | | | o | o | | |
| 2 | o | | | o | | |
| 3 | o | | o | | | |
| 4 | o | | | | | o |
| 5 | o | o | | | | |
| 6 | o | | | | o | |
| 7 | | o | | | o | |
| 8 | | | | | o | o |
| 9 | | | o | | o | |
| R1 | | | | o | | o |
| R2 | | o | | o | | |

STALL RATIOS

IO(RS3) = -2.5
IO(RS4) = -3.2
IO(RS1) = -2.2
IO(RS2) = -1.85

CLOSED SHIFT ELEMENTS

| GEAR | SHIFT ELEMENT A | B | C | D | E | F | GEAR RATIO | GEAR RANGE (SPREAD 9.7) |
|---|---|---|---|---|---|---|---|---|
| 1 | | | o | o | | | 6.52 | 1.65 |
| 2 | o | | | o | | | 3.95 | 1.50 |
| 3 | o | | o | | | | 2.63 | 1.51 |
| 4 | o | | | | | o | 1.74 | 1.40 |
| 5 | o | o | | | | | 1.24 | 1.24 |
| 6 | o | | | | o | | 1 | 1.15 |
| 7 | | o | | | o | | 0.87 | 1.15 |
| 8 | | | | | o | o | 0.75 | 1.11 |
| 9 | | | o | | o | | 0.67 | |
| R | | o | | o | | | -5.56 | |

STALL RATIOS

IO(RS3) = -2.95
IO(RS4) = -3.0
IO(RS1) = +2.17
IO(RS2) = -2.17

CLOSED SHIFT ELEMENTS

| GEAR | SHIFT ELEMENT A | B | C | D | E | F | GEAR RATIO | GEAR RANGE (SPREAD 9.7) |
|---|---|---|---|---|---|---|---|---|
| 1 | o | | | o | | | 5.43 | |
| 2 | o | | o | | | | 3.15 | 1.72 |
| 3 | o | | | | | o | 2.17 | 1.45 |
| 4 | o | o | | | | | 1.59 | 1.36 |
| 5 | o | | | | o | | 1.27 | 1.25 |
| 6 | | o | | | o | | 1 | 1.27 |
| 7 | | | | | o | o | 0.81 | 1.23 |
| 8 | | | o | | o | | 0.70 | 1.16 |
| R1 | | | | o | | o | -5.08 | |
| R2 | | o | | o | | | -2.38 | |

STALL RATIOS

IO(RS3) = +2.5
IO(RS4) = -2.33
IO(RS1) = +2.17

CLOSED SHIFT ELEMENTS

| GEAR | SHIFT ELEMENT A | B | C | D | E | F | G |
|---|---|---|---|---|---|---|---|
| 1 | | | | ○ | | | ○ |
| 2 | | | | ○ | | ○ | |
| 3 | | | ○ | ○ | | | |
| 4 | ○ | | | ○ | | | |
| 5 | ○ | | ○ | | | | |
| 6 | ○ | | | | | ○ | |
| 7 | ○ | | | | | | ○ |
| 8 | ○ | ○ | | | | | |
| 9 | ○ | | | | ○ | | |
| 10 | | ○ | | | ○ | | |
| 11 | | | | | ○ | | ○ |
| 12 | | | | | ○ | ○ | |
| 13 | | | ○ | | ○ | | |
| R | | ○ | | ○ | | | |

STALL RATIOS

IO(RS3) = −3.4
IO(RS4) = −2.2
IO(RS1) = −2.3
IO(RS2a) = −2.3
IO(RS2b) = +1.8

CLOSED SHIFT ELEMENTS

| GEAR | SHIFT ELEMENT A | B | C | D | E | F | G | H |
|---|---|---|---|---|---|---|---|---|
| 1 | | | | ○ | | | | ○ |
| 2 | | | | ○ | | | ○ | |
| 3 | | | | ○ | | ○ | | |
| 4 | | | ○ | ○ | | | | |
| 5 | ○ | | | ○ | | | | |
| 6 | ○ | | ○ | | | | | |
| 7 | ○ | | | | | ○ | | |
| 8 | ○ | | | | | | ○ | |
| 9 | ○ | | | | | | | ○ |
| 10 | ○ | ○ | | | | | | |
| 11 | ○ | | | | ○ | | | |
| 12 | | ○ | | | ○ | | | |
| 13 | | | | | ○ | | | ○ |
| 14 | | | | | ○ | | ○ | |
| 15 | | | | | ○ | ○ | | |
| 16 | | | ○ | | ○ | | | |
| R | | ○ | | ○ | | | | |

STALL RATIOS

I0(RS3) = −2.8
I0(RS4) = −2.0
I0(RS1a)= −2.0
I0(RS1b)= +2.5
I0(RS2a)= −3.4
I0(RS2b)= +1.6

CLOSED SHIFT ELEMENTS

| GEAR | SHIFT ELEMENT A | B | C | D | E | GEAR RATIO | GEAR RANGE (SPREAD 3.2) |
|---|---|---|---|---|---|---|---|
| 1 | | o | | o | | 2.5 | 1.30 |
| 2 | | | o | o | | 1.92 | 1.20 |
| 3 | o | | | o | | 1.6 | 1.16 |
| 4 | o | | o | | | 1.38 | 1.15 |
| 5 | o | o | | | | 1.2 | 1.20 |
| 6 | o | | | | o | 1 | 1.18 |
| 7 | | o | | | o | 0.85 | 1.10 |
| 8 | | | o | | o | 0.77 | |

STALL RATIOS

IO(RS3) = -1.7
IO(RS4) = -3.3
IO(RS1) = -1.5

CLOSED SHIFT ELEMENTS

| GEAR | SHIFT ELEMENT A | B | C | D | E | GEAR RATIO | GEAR RANGE (SPREAD 2.7) |
|---|---|---|---|---|---|---|---|
| 1 | | o | | o | | 2.0 | 1.33 |
| 2 | | | o | o | | 1.5 | 1.25 |
| 3 | o | | | o | | 1.2 | 1.06 |
| 4 | o | | o | | | 1.13 | 1.07 |
| 5 | o | o | | | | 1.06 | 1.06 |
| 6 | o | | | | o | 1 | 1.16 |
| 7 | | o | | | o | 0.86 | 1.15 |
| 8 | | | o | | o | 0.75 | |

STALL RATIOS

IO(RS3) = +1.5
IO(RS4) = −3.0
IO(RS1) = +2.0

CLOSED SHIFT ELEMENTS

| GEAR | SHIFT ELEMENTS A | B | C | D | E | GEAR RATIO | GEAR RANGE (SPREAD 2.0) |
|---|---|---|---|---|---|---|---|
| 1 | | ∘ | | ∘ | | 1.67 | 1.21 |
| 2 | | | ∘ | ∘ | | 1.38 | 1.18 |
| 3 | ∘ | | | ∘ | | 1.17 | 1.06 |
| 4 | ∘ | | ∘ | | | 1.10 | 1.06 |
| 5 | ∘ | ∘ | | | | 1.04 | 1.04 |
| 6 | ∘ | | | | ∘ | 1 | 1.09 |
| 7 | | ∘ | | | ∘ | 0.92 | 1.11 |
| 8 | | | ∘ | | ∘ | 0.83 | |

STALL RATIOS

IO(RS3) = -1.75
IO(RS4) = -3.0
IO(RS1) = -1.5

CLOSED SHIFT ELEMENTS

| GEAR | SHIFT ELEMENT A | B | C | D | E | F | GEAR RATIO | GEAR RANGE (SPREAD 4.1) |
|---|---|---|---|---|---|---|---|---|
| 1 | | ○ | | ○ | | | 3.28 | 1.36 |
| 2 | | | | ○ | | ○ | 2.41 | 1.30 |
| 3 | | | ○ | ○ | | | 1.86 | 1.15 |
| 4 | ○ | | | ○ | | | 1.62 | 1.11 |
| 5 | ○ | | ○ | | | | 1.46 | 1.14 |
| 6 | ○ | | | | | ○ | 1.28 | 1.11 |
| 7 | ○ | ○ | | | | | 1.15 | 1.07 |
| 8 | ○ | | | | ○ | | 1.08 | 1.08 |
| 9 | | ○ | | ○ | ○ | | 1 | 1.11 |
| 10 | | | | ○ | ○ | ○ | 0.90 | 1.11 |
| 11 | | | ○ | | ○ | | 0.81 | |

STALL RATIOS

IO(RS3) = −2.0
IO(RS4) = −2.0
IO(RS1) = −2.2
IO(RS2) = +1.9

CLOSED SHIFT ELEMENTS

| GEAR | SHIFT ELEMENT A | B | C | D | E | F | G | H |
|---|---|---|---|---|---|---|---|---|
| 1 | | ○ | | ○ | | | | |
| 2 | | | | ○ | | | | ○ |
| 3 | | | | ○ | | | ○ | |
| 4 | | | | ○ | | ○ | | |
| 5 | | | ○ | ○ | | | | |
| 6 | ○ | | | ○ | | | | |
| 7 | ○ | | ○ | | | | | |
| 8 | ○ | | | | | ○ | | |
| 9 | ○ | | | | | | ○ | |
| 10 | ○ | | | | | | | ○ |
| 11 | ○ | ○ | | | | | | |
| 12 | ○ | | | | ○ | | | |
| 13 | | ○ | | | ○ | | | |
| 14 | | | | | ○ | | | ○ |
| 15 | | | | | ○ | | ○ | |
| 16 | | | ○ | | ○ | ○ | | |
| 17 | | ○ | | ○ | ○ | | | |

STALL RATIOS

I0(RS3) = +2.0
I0(RS4) = −2.4
I0(RS1a) = +2.0
I0(RS1b) = −1.5
I2b/22a,b = 1.75

MULTI-STEP GEAR

Matter enclosed in heavy brackets [ ] appears in the original patent but forms no part of this reissue specification; matter printed in italics indicates the additions made by reissue.

*The present Application is a reissue of and claims benefit of U.S. patent application Ser. No. 10/089,808 filed Apr. 3, 2002 which is a national stage completion of PCT International Application Ser. No. PCT/EP00/09993 filed Oct. 11, 2000 which claims priority from German Patent Application Serial No. 199 49 507 filed Oct. 14, 1999.*

FIELD OF THE INVENTION

The present invention concerns a multi-step transmission.

BACKGROUND OF THE INVENTION

Such a transmission has been disclosed by EP 0 434 525 A1, which encompasses, essentially, an input drive shaft and an output drive shaft, which are arranged coaxial to one another, a double planetary gear set placed concentric to the output drive shaft and five shifting elements in the form of three shift elements and two brakes, the selective blocking of which respectively determine, pairwise, the different gear ratios between the input drive shaft and the output drive shaft.

The known transmission possesses two power paths, wherein a first element of the double planetary gear set is connected by means of a first shift element with the first power path. A second element of the double planetary gear set is connected to the output drive shaft and a third element is connected with the second power path by means of a third shift element and is braked by means of a first brake. A fourth element of the double planetary gear set is connected with the first power path by means of a second shift element and is braked by a second brake, so that a selective shifting pairwise between the shifting organs assures that six forward gear positions are available. This arrangement then comprises a first gear through the first shift element and the first brake, a second gear through the first shift element and the second brake, a third gear through the first shift element and the second shift element, a fourth gear through the first shift element and the third shift element, a fifth gear through the second shift element and the third shift element a sixth gear through the third shift element and the second brake, and finally, a reverse gear position through the second shift element and the first brake.

SUMMARY OF THE INVENTION

The purpose of the present invention is to be found in the creating of a multi-step transmission, which encompasses at least seven forward gear positions with a favorable gear step and ample spread, and is relatively economical to manufacture.

An essential advantage is to be found in the fact, that the invented multi-step transmission offers at least seven forward gear positions with a reduced number of gear sets and shift elements. In each gear, into which a shift is made, only two shift elements are actuated. By the shifting from one gear to the next, simply one shift element was open and another shift element was closed. In this way, a GroupWise shifting of critical shifting quality, in which a plurality of shift elements must be shifted simultaneously, is avoided.

BRIEF DESCRIPTION OF THE DRAWINGS

The invention will now be described, by way of example, with reference to the accompanying drawings in which.

DETAILED DESCRIPTION OF THE INVENTION

Figures 1A, 1B:
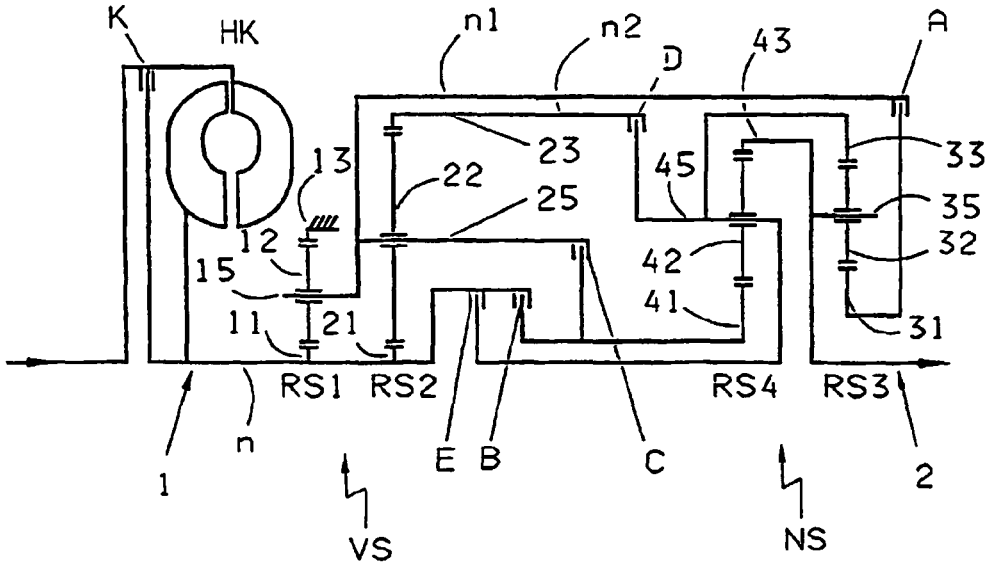
FIGS. 1A and 1B, a first embodiment form of a multi-step transmission with seven forward gear positions and one reverse gear position.

In each figure are presented, in accordance with the respective embodiment of the invented multi-step transmission, the power flow schematic chart (FIGS. 1A to 16A) as well as the shifting-logic accompanied by the assigned gear ratios of the individual gears, the gear staging, the transmission range, and the transmission ratio of the individual planetary gear sets (FIGS. 1B to 16B). From the individual planetary gear set ratios, it becomes evident to the expert from the Kutzbach-plan, that group shifting is avoided in all the embodiments here presented.

The following considerations lead to the invention. In order to create, with five shift elements, a multi-step transmission which is counter to the state of the technology and is relatively economical to manufacture, and that has seven forward gear positions and one reverse gear position, then, on the input drive shaft, two input-side gear sets must be provided. These two input-side gear sets, in addition to the speed of rotation "n" introduced by the input drive shaft, engender two further speeds of rotation n1 and n2. Contrary to this, in the case of the known multi-step transmission described in the opening passages, only one input-side gear set is provided on the input drive shaft. This said input-side gear set, in addition to the input speed of rotation n produces one additional speed of rotation. By means of the activation of the shift elements, in the case of the present invention, the speeds of rotation n1, n2 and the input speed of rotation n, corresponding to the shifted flow of power, are transferred to the output drive shaft. By means of placing additional shift elements, it becomes possible, utilizing the invented multi-step transmission with seven forward gear positions and one reverse gear position, to conceive of various multi-step transmissions with more than seven forward gear positions and at least one reverse gear position. This is true especially in the case of passenger motor vehicles, busses and trucks. For off-road vehicles a cross-country reduction gear can be designed with special gear staging. For the installation in motorcycles and bicycles, multi-gear drives without a reverse gear position can be made available.

In the following, in connection with FIGS. 1 to 5, different variants of the present multi-step transmission with seven forward gear positions and one reverse gear position are discussed. These transmissions can be shifted through five gear stages. Since, with the invented transmission concepts, a span of 9 and more is achieved, it becomes possible that in comparison to the six-stage transmission span achieved as described in the introductory passages, for example, instead of a torque converter, normally used as a starting element, a simple hydraulic shift element can be put to this service, without denying high starting power for the vehicle.

In the FIGS. 1 to 5, the input drive shaft is designated with 1, the shift elements are respectively denoted as A, B, C, D, and E. The first planetary gear set of the input-side gear set VS is designated with RS1, the second planetary gear set of that input-side gear set is RS2. In like manner, the first and second gear sets of the shiftable output-side gear set NS are designated RS3 and RS4.

All five embodiments of the FIGS. 1 to 5 hold in common, that the input-side gear set RS1, besides the input speed of rotation n of the input drive shaft 1, generate a first additional speed of rotation n1 and the second input-side gear set RS2 produces a second supplementary speed of rotation n2. In each gear shifted to, in every case, only two shift elements are closed.

The input-side gear sets comprise a non-shiftable two carrier, 4-shaft drive, wherein at least one shaft, and as a maximum one shaft per input-side gear set runs with the speed of rotation of n of the input drive shaft and at least one shaft, and at a maximum, one shaft per input-side gear set is immobile.

The gear set RS1 possesses a sun gear 11, planet gears 12 and an internal gear 13. The gear set RS2 shows a sun gear 21, planet gears 22 and an internal gear 23. The planetary carrier designated as 15 is common to the planet gears 12 and the carrier designated with 25 is common to the planetary gear sets 22.

In the case of the shiftable output-side gear sets NS, the arrangement is a shiftable two carrier, four shaft drive, which includes the planetary gear sets RS3 and RS4. The gear set RS3 has a sun gear 31, planet gears 32 and an internal gear 33. Correspondingly, the gear set RS4 of the output-side drive NS comprises a sun gear 41, planet gears 42, and an internal gear 43. The common carrier of the planet gears 32 is designated as 35 and the common carrier of the planet gears 42 is designated with 45. The carrier 45 of the gear set RS4 is connected with one shaft of the gear set RS3. Onto this coupling shaft, the shift elements E and D are affixed.

The shift elements B and C are connected to a central gear of the gear set RS4, wherein, by the term "central gear", either a sun gear or an internal gear of the gear set is to be understood. The shift element A is connected to one central gear of the gear set RS3.

Figures 2A, 2B:
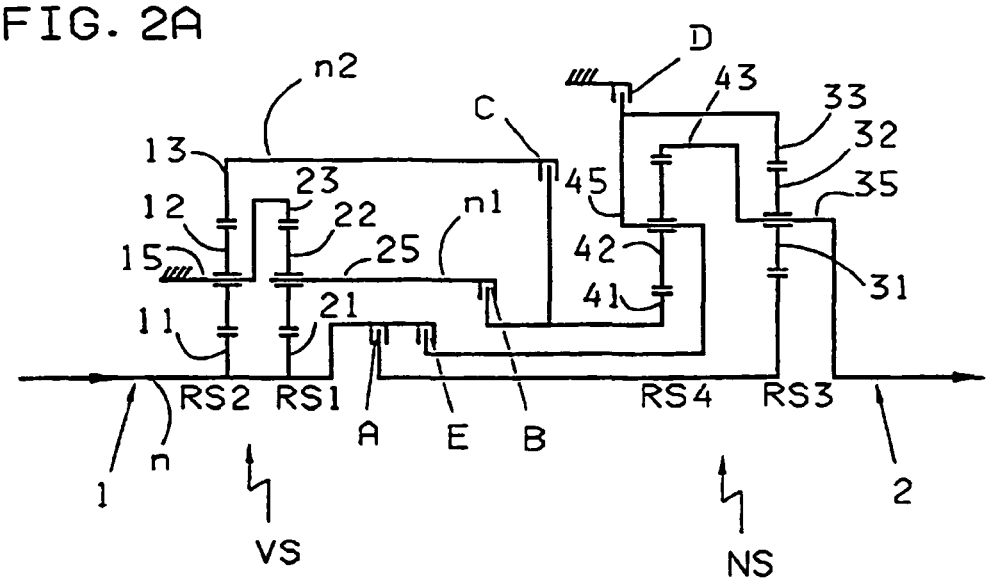
FIGS. 2A and 2B, a second embodiment form of a multi-step transmission with seven forward gear positions and one reverse gear position.
Figures 3A, 3B:
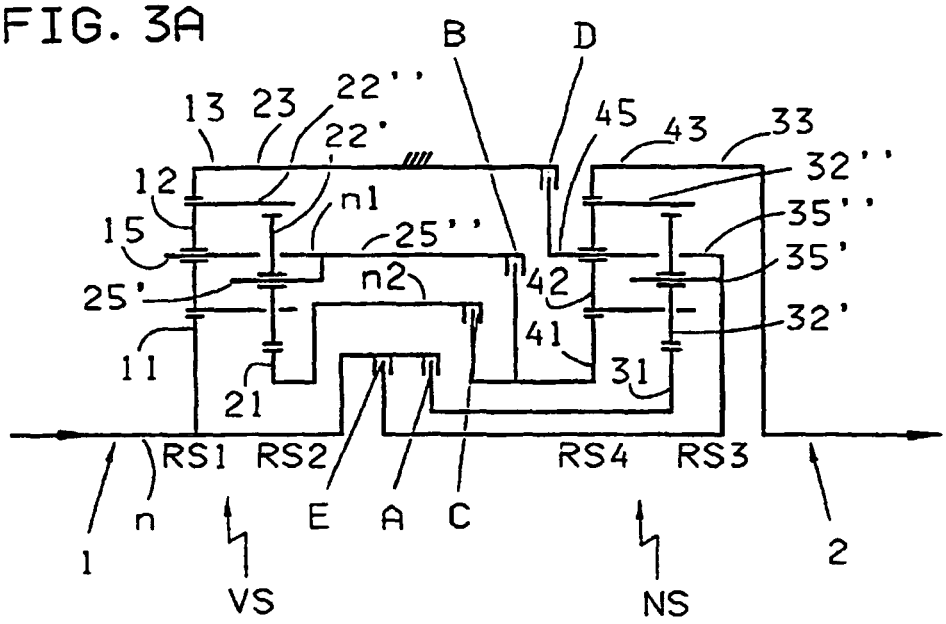
FIGS. 3A and 3B, a third embodiment form of a multi-step transmission with seven forward gear positions and one reverse gear position.

Either the shaft connected with the shift element A combined with the central gear of the gear set RS4—which is not connected with the shift elements B and C—forms the second coupling shaft (FIG. 4A, FIG. 5A), or the second coupling shaft is connected with the output drive shaft 2 (FIG. 1A, FIG. 2A, FIG. 3A).

For the speed of rotation of the shafts and shift elements, the following points are valid:

1. The speed of rotation on the input drive shaft and shift element E is n=1 (as a standard value),
2. The speed of rotation of the shift element D is greater than/equal to 0,
3. The speed of rotation of the shift element D is less than/equal to the speed of rotation at the shift element B,
4. The speed of rotation of the shift element C is less than the speed of rotation on the shift element B,
5. The speed of rotation of the shift element B is less than or equal to 1,
6. The speed of rotation of the shift element A lies in the range of 0 to 1,
7. As maximum, two running shafts in the output-side NS have the same speed of rotation,
8. The speeds of rotation introduced by the shifting elements A and D to the gear set RS3, in connection with the gear ratio of the gear set RS3, produce an output drive shaft speed of rotation, which is greater than the output drive shaft speed of rotation, which is introduced by means of the shifting elements C and D onto the gear set RS4 in connection with the gear ratio of the gear set RS4, and in the case, that the shaft connected with the shift element A forms a coupling shaft with a central gear of the gear set RS4 of the shiftable output-side gear set NS, then, additionally with the gear ratio of the gear set RS3 an output drive shaft speed of rotation is produced.

FIG. 1A shows a first embodiment of the invented multi-step transmission with two coupled, non-shiftable input-side gear sets. In this arrangement, the input drive shaft 1 is connected with the sun gears 11 and 21 of the input-side gear sets RS1 and RS2. The internal gear 13 of the first input-side gear set RS1 is stationarily fixed. The planetary carriers 15 and 25 of the two input-side gear sets RS1 and RS2 are connected together. The internal gear 23 (speed of rotation n2) of the second input-side gear set RS2, can be connected by means of the shift element D to the internal gear 33 of the first output-side gear set RS3 and the carrier 45 of the second output-side gear set RS4. Further, the planetary carriers 15 and 25 (speed of rotation n1) can be connected by means of the shift element A with the sun gear 31 of the first output-side gear set RS3, as well as by means of the shift element C with the sun gear 41 of the second output-side gear set RS4. The input drive 1 is connectable by means of the shift element B to the sun gear 41 and to the carrier 45 by means of the shift element E. In the output-side gear sets NS, the carrier 35 of the gear set RS3 is connected with the internal gear 43 of the gear set RS4 and with the output drive shaft 2. Besides this, the internal gear 33 of the gear set RS3 is connected with the carrier of the gear set RS4.

The forward gear positions 1 to 7 and the reverse gear position R, with the aid of the control of the output-side gear set NS, i.e., the gear sets RS3 and RS4, which respectively have the speeds of revolution of n, n1 and n2, can be attained by means of selective shifting of the five shift elements A to E, in accord with the shift sketch of the FIG. 1B. When this is done, it is an essential advantage, that by the shift change from one gear to the next gear, principally one shift element is open and only one shift element in need be closed. In this way, shifting of questionable quality, with a simultaneous engagement of a plurality of shift elements (group shifting), is avoided.

Advantageous in the embodiment 1 of the invented multi-step transmission, is especially the large spread (greater than 9) in the case of similar more favorable gear steps, which are described in the introductory passages as being state of the technology for 6-gear automatic transmissions. In this way, in the application example of a passenger car, for example, the normally installed torque converter, serving as a startup element, could be substituted for by a hydraulic shift element and/or a lamellar shift element integrated into the transmission without having to dispense with a high startup power. A possible embodiment is shown as an example in the FIG. 1A. With the depicted arrangement, the advantages gained are a lesser weight, favorable dimensioning for installation in the vehicle tunnel space giving a reduced length of construction, as well as achieving a reduction in manufacturing costs.

In the following, in connection with FIG. 2A, a further embodiment of the present invention is described. Details of the FIG. 2A, which have already been explained in FIG. 1A, still carry the same reference numbers.

The embodiment form 2A has, contrary to the embodiment in FIG. 1A a generally more simply controlled brake serving as a fifth shifting element instead of a clutch element.

In the embodiment shown in FIG. 2A, both sun gears 11 and 21 are connected with the input drive shaft 1. By means of the shift element A, the input drive shaft 1 can be connected with the sun gear 31 and by means of the shift element E, also connected with the planetary carrier 45. The planetary carrier 15 (speed of rotation n1) can be connected by means of the shift element B with the sun gear 41. The internal gear 13 is connected with the carrier 25, wherein the carrier 25 is rigidly affixed to the housing. The internal gear 23 (speed of rotation n2) can be connected with the sun gear 41 by means of the shift element C. The carrier 45 can be connected to the housing by means of brake D. The internal gear 33 is connected with the carrier 45. The internal gear 43 is connected with the carrier 35 and with the output drive shaft 2.

As is shown in the closed condition state of the five shift elements A to E the transmission shown in FIG. 2A permits shifting into seven forward gear positions and into one reverse gear position.

Advantageous in the embodiment 2 of the invented multi-step transmission is especially the overdrive characteristic of the two upper gears, in regard to the reduction of fuel consumption and running noise. A further advantage is the designed simple formulation possibility of having a brake D instead of a shift element, for instance in regard to the delivery of pressurized oil for the activation.

The FIG. 3A shows a further embodiment of the invented multi-step transmission with two coupled, non-shiftable input-side gear sets. Input-side gear set VS and output-side gear set NS are here constructed as Ravigneaux-gear sets. The input drive shaft 1 is connected with the sun gear 11 of the gear set RS1, by means of the shift element E with the carriers 35'. 35" of the inner and out planet gears 32', 32" of the gear set RS2, and can be connected with the carrier 45 of the gear set RS4. Further the input drive shaft 1 can be connected with sun gear 31 of the gear set RS3 by means of the shift element A. The carriers 15, 25', and 25", which are connected together, (speed of rotation n1) of the gear sets RS1 and RS2, can be connected with the sun gear 41 of the gear set RS4 by means of the shift element B. The planet gears 12 of the gear set RS1 and the outer planet gears 22" of the gear set RS2 are joined to one another. The sun gear 21 (speed of rotation n2) of the gear set RS2 can be connected with the sun gear 41 of the gear set RS4 by means of the shift element C. The internal gear 13 of the gear set RS1 is immobilized. By means of the brake D, the carriers 35', 35" and 45 may be made stationary. The planet gears 42 of the gear set RS4 and the outer planet gears 32" of the gear set RS3 are coupled together. The output drive shaft 2 is rigidly bound to double internal gears 33 and 43.

With the arrangement of FIG. 3A, shifting into seven forward gear positions and one reverse gear position are made available through the shift element logic displayed in the table of FIG. 3B.

Advantageous in the embodiment 3 of the invented multi-step transmission is especially the favorable cost formulation of the four planetary gear sets with only two internal gears. Beyond this, the over-drive characteristic of the two upper gears can be employed for the saving of fuel and for a lessening of the noise emission.

Figures 4A, 4B:
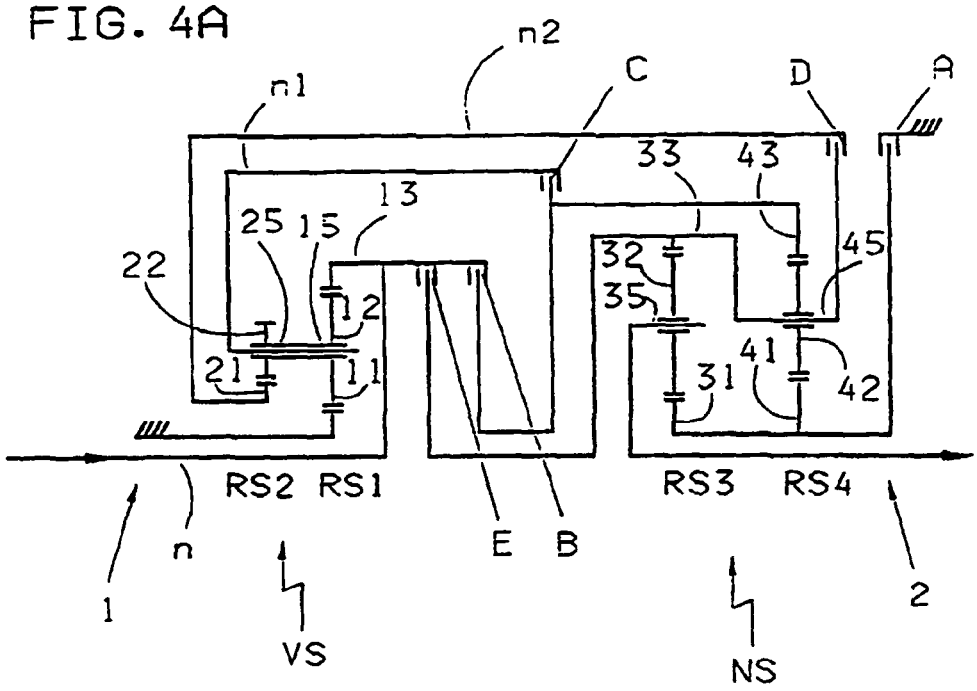
FIGS. 4A and 4B, a fourth embodiment form of a multi-step transmission with seven forward gear positions and one reverse gear position.

FIG. 4A shows yet another embodiment of the invented multi-step transmission with two coupled , non-shiftable input-side gear sets. In this matter, the additional speeds of rotation n1 and n2 are produced through the input-side gear sets RS1 and RS2., whereby the carriers 15 and 25 of the planet gears 12 and 22 of this gear set are connected together. The input-side shaft 1 is connected with the internal gears 13 and 23 of the gear sets RS1 and RS2, and by means of the shift element E can be connected with the internal gear 33 of the third gear set RS3, as well as being connectable by means of the shift element B with the internal gear 43 of the fourth gear set RS4. The sun gear 11 of the first gear set RS1 is affixed to the housing. The sun gear 21 (speed of rotation n2) of the second gear set RS2 can be connected by means of the shift element D to the carrier 45 of the gear set RS4, whereby the said carrier 45 is connected to the internal gear 33 of the gear set RS3. The carriers 15 and 25 (speed of rotation n1) of the planet gears 12 and 22 of the gear sets RS1 and RS2 can be connected by the shift element C with the internal gear 43 of the gear set RS4. The sun gears 31 and 41 of the gear set RS3 and RS4 can be blocked in common by the brake A. The carrier 35 of the gear set RS3 is connected with the output drive shaft 2.

The arrangement given in the schematic sketch of FIG. 4A allows the tabulated presentation of seven forward gear positions and one reverse gear position by the closure of the five shift elements A through E.

The design 4 of the invented multi-step transmission is particularly favorable for use in off-road vehicles, since in this case, because of the stall-gear ratios of the gear sets, as shown in FIG. 4B, a creep gear with a high ratio such as i (first gear) >8, is available upon simultaneous favorable gear ratio in the upper travel speed areas. Further, the use of a stepped planet gear provides, in the case of the simultaneous drop-out of a fourth internal gear, a saving in the manufacturing costs.

Figures 5A, 5B:
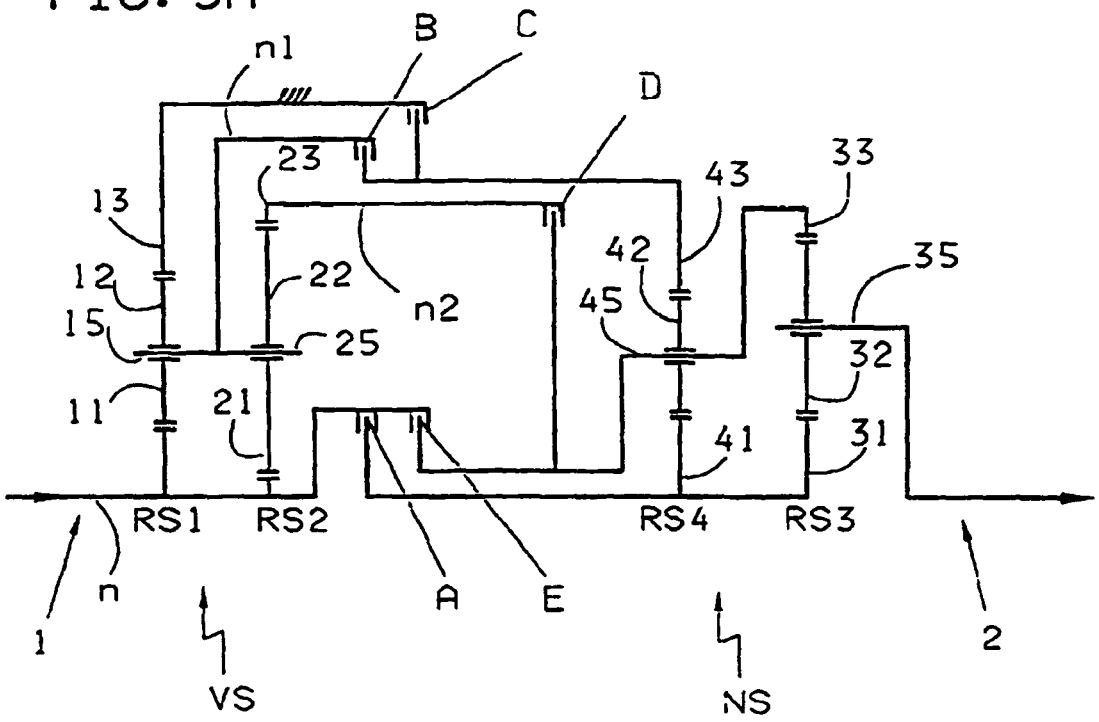
FIGS. 5A and 5B, a fifth embodiment form of a multi-step transmission with seven forward gear positions and one reverse gear position.

In the design of the FIG. 5A of the invented multi-step transmission with two, coupled, non-shiftable, input-side gear sets, the internal gear 13 is made immobile. The carrier 15 (speed of rotation n1) is connected with the carrier 25 and can be connected with the internal gear 43 by means of the shift element B. The internal gear 23 (speed of rotation n2) can be connected with the carrier 45 by means of the shift element D, and thus to the therewith connected internal gear 33. The input drive shaft 1 is connected with the sun gears 11 and 21 and can be connected with the sun gears 41 and 31 by means of the shift element A, and further by the shift element E, can be connected with the carrier 45 and the internal gear 33. In the case of the closed brake C and the open shift element B, the internal gear 43 can be adjusted to the speed of rotation zero. The carrier 35 is connected to the output drive 2.

The exact closed conditions of the five shift elements A to E are obvious from FIG. 5B for the individual forward gear positions 1 to 7 and for the reverse gear position R.

The design of the assembly 5 of the invented multi-step transmission is similar to the design structure 4, in that it is especially favorable for off-road vehicles, since in this case, because of the stall gear ratios to be noted in the FIG. 5B relating to the gear sets, an extreme crawl gear with a very high ratio, i (first gear)=10, can be achieved by shifting. Conditioned by the very large gap of gear ratio from the first gear ( crawl gear) into the second gear, it can be to advantage, to design this said crawl gear as a special, manually operated gear activated by the driver. By the combined large spread of 15, there is available a favorable transmission stepping for normal driving operation. The over-drive characteristic of the two upper gears contributes to reduced fuel consumption and engine noise while driving.

Figures 6A, 6B:
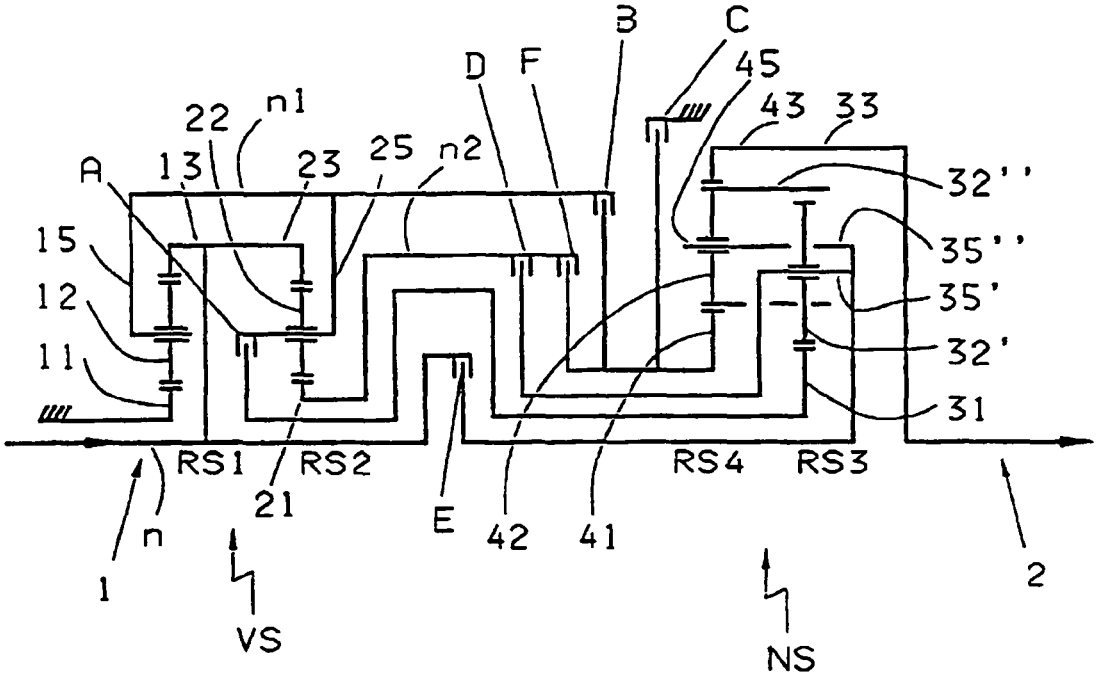
FIGS. 6A and 6B, a sixth embodiment form of a multi-step transmission with ten forward gear positions and one reverse gear position.

The design presented in FIG. 6A shows an invented multi-step transmission with two coupled, non-shiftable, input-side gear sets, in the case of which shifting can be carried out with six shift elements and one reverse gear position to obtain ten forward gear positions along with the said one reverse gear position. On the shaft with the shift elements B and C of the shiftable output-side gear set is provided an additional shift element F. Thus we have: NC<NF<Nb.

In this case, the input drive shaft 1 (speed of rotation n) is connected with the internal gear 13 and the internal gear 23. The said input drive shaft 1 can also be connected, by use of the shift element E, with combined carriers 45 of the gear set RS4, carrier 35" of the outer planet gears 32" of gear set RS3 and carrier 35' of the inner planet gears 32' of the gear set RS3. The planet gears 32 and 42 are coupled together. The carrier 25 is connected with the carrier 15 (speed of rotation n1) and can be connected with the sun gear 41 by the shift element B. The sun gear 41, upon the activation of the brake C, can be blocked, that is, connected to the housing. The carriers 15 and 25 (speed of rotation n1) can be connected with the sun gear 31 by the shift element A. The sun gear 21 (speed of rotation n2) can be connected by the shift element D with the carrier 35' of the inner planet gears 32' of the gear set RS3 and can be connected by the shift element F with the sun gear 41 of the gear set RS4. The internal gears 33 and 43 are joined together and also are connected to the output drive shaft 2.

In the case of these multi-step transmissions, it is possible, by closing the shift elements A to F, and in consideration of the stall ratios of the gear sets given in the table of FIG. 6B, to achieve shifting into ten forward gear positions and one reverse gear position. Because of the additional shift element, there is made available three additional forward gear positions, in contrast to the above described designs showing 1 to S of the invented multi-step transmissions with seven forward gear positions. Advantageously, the gear steps can be designed to fit in a close space, which makes this particular arrangement particularly favorable for a vehicle with a diesel motor.

In the following, in connection with the FIGS. 7A, 7B, a multi-step transmission in accord with the invention will be described, which said transmission has two, coupled, non-shiftable input-side gear sets. In the case of these gear sets, shifting is available, by means of six shift elements A to F, through nine forward gear positions and two reverse gear positions.

The input drive shaft 1 is connected to the internal gear 13 of the input-side gear set RS1 and the thereto connected internal gear 23 of the input-side gear set RS2. Further, the input drive shaft can be connected to the carrier 45 by means of the shift element E and by means of the shift element B, can be connected with the sun gear 41. The carrier 25 of the planet gears 22 is connected with the carrier 15 (speed of rotation n1) as well as with the sun gear 31 by means of the shift element A. In addition, by the activation of the shift element F, the carrier 25 and the carrier 15 can be connected to the sun gear 41. The sun gear 21 (speed of rotation n2) is connectable by the shift element C with the sun gear 41 as well as connectable with the carrier 45 by means of the shift element D. The carrier 45 is connected to the internal gear 33. The internal gear 43 is connected with the carrier 35 and with the output drive shaft 2.

Figures 7A, 7B:
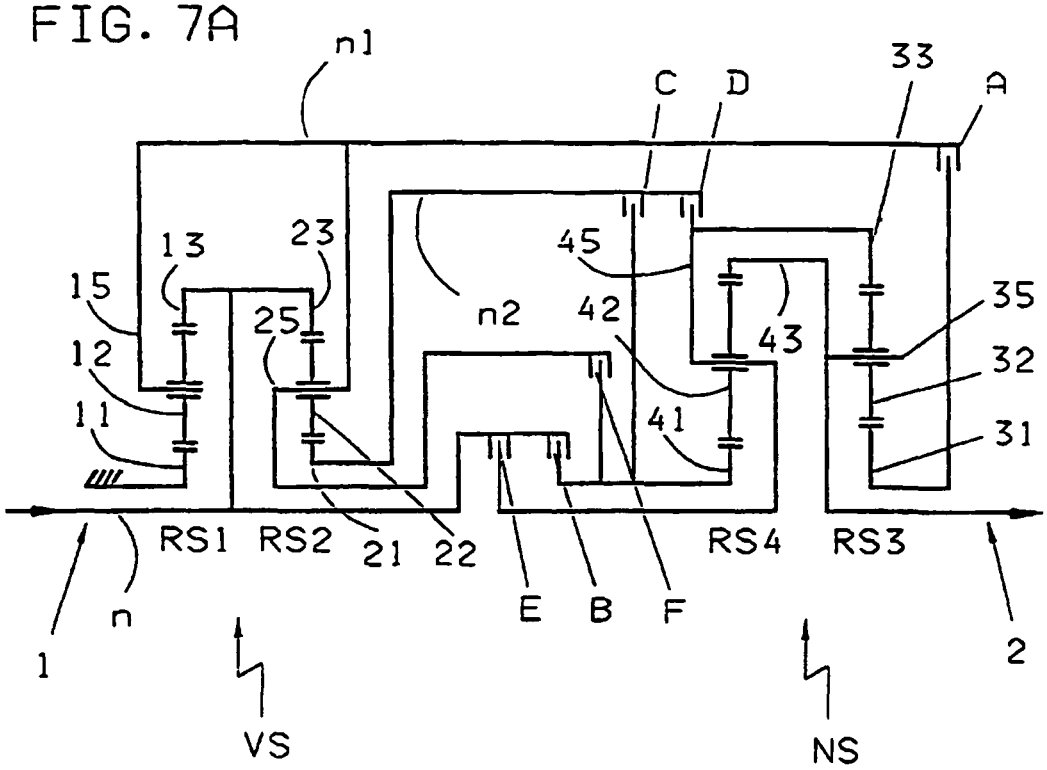
FIGS. 7A and 7B, a seventh embodiment form of a multi-step transmission with nine forward gear positions and two reverse gear positions.

With this described embodiment 7 of the invented multi-step transmission, it is possible, through selective closure of the shift elements A to F, as shown in the table of FIG. 7B and in consideration of the also tabulated stall ratios of the gear sets, to shift through nine forward gear positions with a close gear stepping and advantageously to shift into two reverse gear positions. A special reverse gear position with a reduced startup ratio in contrast to the "normal" reverse gear position startup ratio can, for example, be applied in a winter driving program for the automatic transmission.

Figures 8A, 8B:
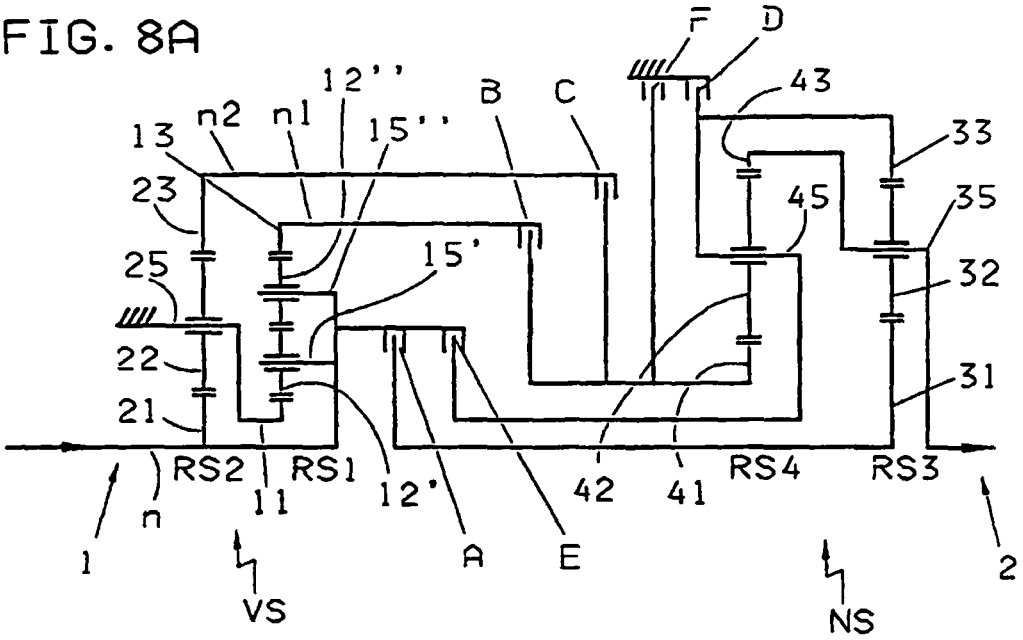
FIGS. 8A and 8B, an eighth embodiment form of a multi-step transmission with nine forward gear positions and one reverse gear position.

The embodiment of the FIG. 8A shows an invented multi-step transmission with two coupled, non-shiftable input-side gear sets, whereby, for the activation of this transmission, a total of six shift elements A to F are provided for shifting into nine forward gear positions and one reverse gear position.

In comparison to the multi-step transmission of the FIG. 6A, which is furnished with five shift elements and one brake, the multi-step transmission outlined in FIG. 8A possesses four shift elements and two brakes, whereby the number of the forward gear positions is reduced by one gear from the number of forward gear positions as shown in FIG. 6A.

Even though, in this case, the gear set RS2 is minus one gear set, the gear set RS1 is plus one gear set. The input drive shaft 1 is connected with the sun gear 21 as well as with the carrier 15" or the outer planet gears 22" of the gear set RS1, and by means of the shift element A can be connected with the sun gear 31 and by means of the shift element E, can be connected with the carrier 45. The carrier 25 is, on the one hand, bound to the housing, and on the other side, connected with the sun gear 11 of the gear set RS1. The carrier 15' of the inner planet gear 12' is connected with the carrier 15" of the outer planet gears 12" of the gear set RS1. The internal gear 13 of the gear set RS1 (speed of rotation n1) can be connected with the sun gear 41 by means of the shift element B. The internal gear 23 (speed of rotation n2) can be connected with the sun gear 41 through the shift element C. By the activation of the brake F, the sun gear 41 is connectable with the housing. The carrier 45, upon the activation of the brake D, can be connected with the housing. Beyond this, the carrier 45 is connected to the internal gear 33. The internal gear 43 connects with the carrier 35 and with the output drive shaft 2.

The shifting logic for the six shift elements A to F for the shifting to the nine forward gears and the reverse gear position of the multi-step transmission in accord with FIG. 8 is shown in the tables of FIG. 8B.

In a fortunate development, in the case of the embodiment 8 of the invented multi-step transmission, two shift elements are converted to brakes, whereby, advantages are brought about, relative to shift element construction, such as, for example, by a simple installation of the pressure oil channeling within the housing. Particularly advantageous is also the very harmonious gear stepping of the nine forward gear positions with almost continual, slowly occurring, gear stepping leading to the upper gears.

In the following, in connection with the FIGS. 9A, 9B, a further inventive multi-step transmission is explained, in which with a total of six shift elements A to F, eight forward gear positions and two reverse gear positions are available for shifting.

The special point of this transmission is, that only one, non-shiftable, input-side gear set RS1 is present instead of two input-side gear sets as have been described up to this time. The input drive shaft 1 (speed of rotation n) is connected with the sun gear 11 of the gear set RS1 (Plus-gear set), and can be connected with the carrier 45 by means of the shift element E, as well as being connectable by shift element B with the sun gear 41. The carrier 15' of the inner planet gears 12' of the gear set RS1 and the carrier 15" of the outer planet gears 12" of the gear set RS1 are connected together and affixed to the housing. Moreover, the carrier 15' and the carrier 15", by means of the shift element C, can be connected with the sun gear 41. The internal gear 13 (speed of rotation n1) can be connected with the sun gear 41 by the shift element F and also connected to the sun gear 31 by means of the shift element A. The internal gear 43 is connected to the internal gear 33 and connected to the output drive shaft 2. The carrier 45 (of the planet gears 42), carrier 35'(of the inner planet gears 32') and carrier 35" (of the outer planet gears 32") are bound together and can be blocked by the brake D. The planet gears 32" and 42 are, in this case, also coupled.

Figures 9A, 9B:
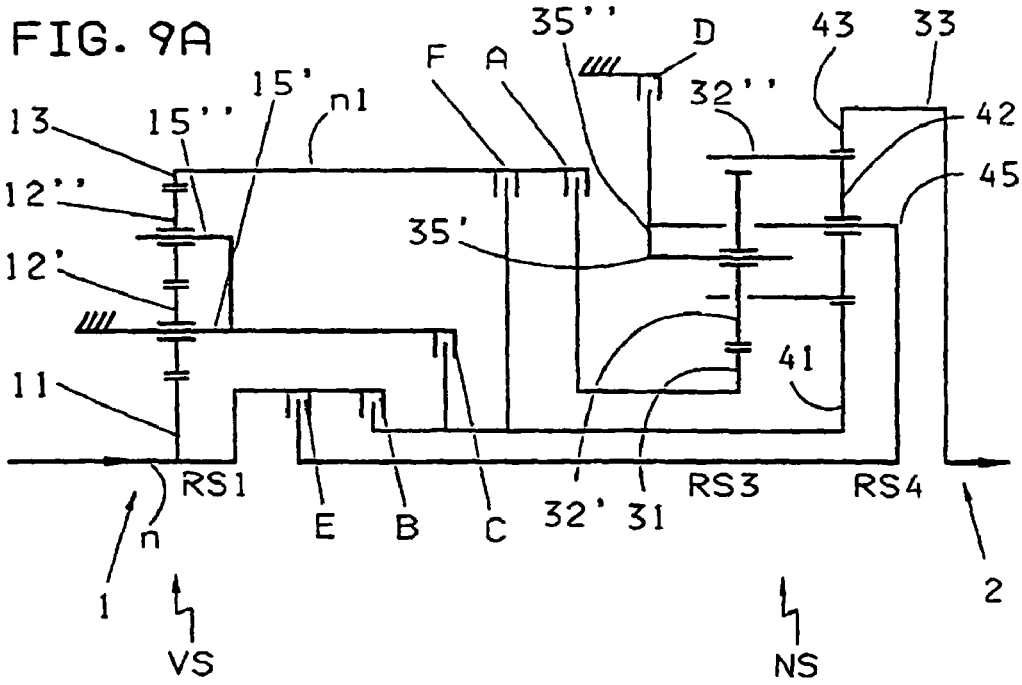
FIGS. 9A and 9B, a ninth embodiment form of a multi-step transmission with eight forward gear positions and two reverse gear positions.

The shifting logic of this multi-step transmission for the shifting into eight forward gear positions and two reverse gear positions by the closure of the shift elements A to F is tabulated in FIG. 9B.

Advantageously, in the case of the embodiment 9 of the invented multi-step transmission, besides the number of gears, is particularly the space saving and favorable costs associated therewith, since only three planetary gear sets with a total of two internal gears need be provided. The inter-gear stages are harmonic, where by, besides the "normal" reverse, also a "quicker" reverse gear position can be shifted into, similar to that of the embodiment 7.

Figures 10A, 10B:
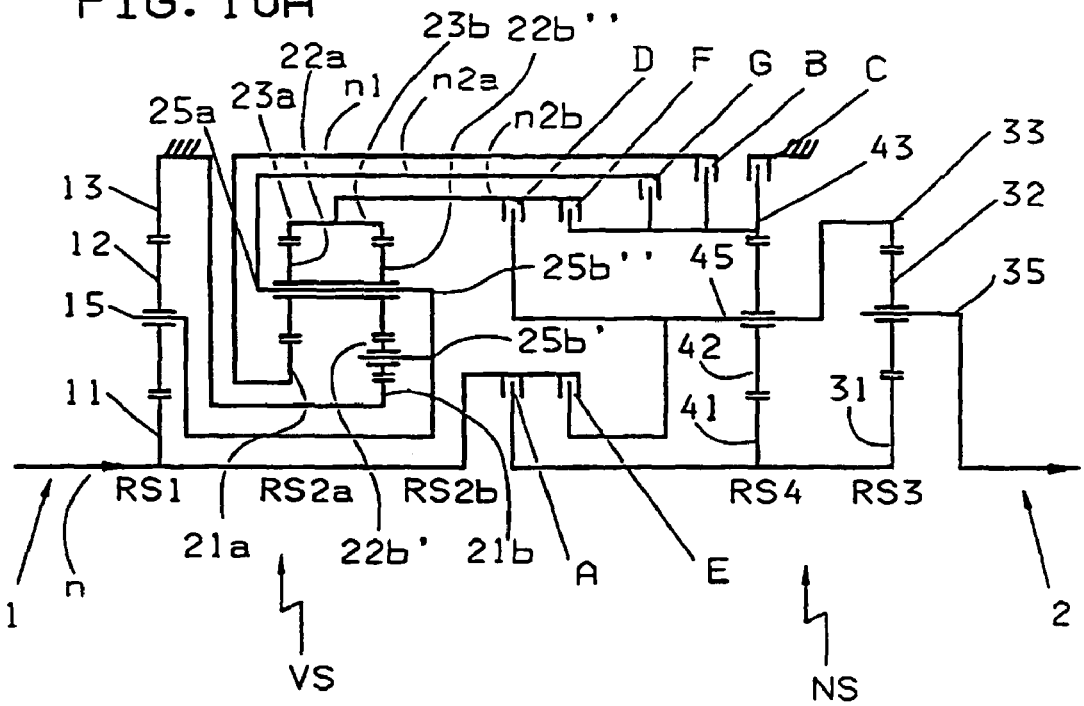
FIGS. 10A and 10B, a third embodiment form of a multi-step transmission with thirteen forward gear positions and one reverse gear position.

The FIG. 10A shows a multi-step transmission with three, coupled, non-shiftable input-side gear sets RS1, RS2a and RS2b, by means of seven shift elements A to G, shifting is available through thirteen forward gear positions and one reverse gear position. On the shaft with the shift elements B, C and F, an additional shift element G has been provided. Thus, the valid relationship is NF>nG>Nb. In input speeds of rotation are produced through a non-shiftable three carrier, five shaft gear arrangement.

The input drive shaft 1 (speed of rotation n) is bound to the sun gear 11 of the first input-side gear set RS1 and can be connected by means of the shift element A with the sun gear 31 of the first output-side gear set RS3 and the thereto connected sun gear 41 of the second output-side gear set RS4 and can be connected further by means of the shift element E with the carrier 45 of the second output-side gear set RS-4.

The gear set RS2, which has been installed in the described transmissions up to this point, is now replaced by the gear sets RS2a and RS2b, whereby, the carriers 25a and 25b" of the planet gears 22a of the gear set RS2a and the outer planet gears 22b" of the plus-transmission constructed gear set RS2b are all connected together. The planet gears 22a and 22b" are coupled together. The carrier 15 is connected to the carriers 25b' of the inner planet gears 22b' and to the carrier 25b" of the outer planet gears 22b". Beyond this the carrier 25b" can be connected with the internal gear 43 (speed of rotation n2a) by means of the shift element G. The internal gear 43 can be blocked by the brake C. The sun gear 21a of the gear set RS2a (speed of rotation n1) can be connected with the internal gear 43 by means of the shift element B. The internal gear 23a of the gear set RS2a and the internal gear 23b of the gear set RS2b are connected together (speed of rotation n2b) and can be connected with the internal gear 43 by means of the shift element F, and by the shift element D can be connected with the carrier 45 and the therewith attached internal gear 33. The carrier 35 is connected to the output drive shaft 2. Finally, the sun gear 21b of the gear set RS2b and the internal gear 13 of the gear set RS1 are connected with the housing.

With this described multi-step transmission, it is possible, through selective closure of the seven shift elements A to G, in combination with the tabulated stall ratios as presented in the table of FIG. 10B to shift through thirteen forward gear positions and one reverse gear position.

The advantages of this embodiment 10 of the invented multi-step transmission lie thus in the high number of gear changes along with a very compact installation space with only five planetary gear sets and seven shift elements. By means of a selected choice of the gear ratios of the gear sets, from the embodiment 10, a multi-step transmission with two reverse gear positions can be developed, but then with only twelve forward gear positions.

Figures 11A, 11B:
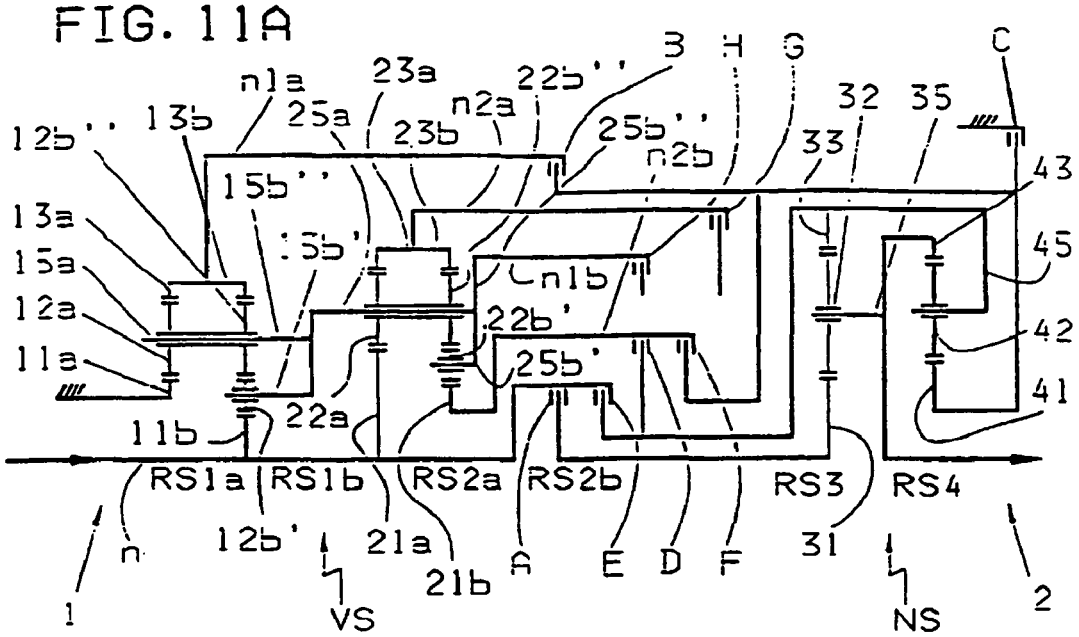
FIGS. 11A and 11B, an eleventh embodiment form of a multi-step transmission with sixteen forward gear positions and one reverse gear position.

In the embodiment of the invented multi-step transmission shown in FIG. 11A, it is possible, with eight shift elements A to H, to shift through a total of sixteen forward gears and one reverse gear. The shaft with the shift elements B, C, F and G is furnished with an additional shift element H. Thus the relationships are now nG>nH>Nb. The input speed of rotation is produced by a non-shiftable four carrier, six shaft gear drive.

The input-side gear set VS comprises, in total, four connected, non-shiftable planet gear sets. The input-side gear set RS1 consists of a gear set RS1a and a gearset RS1b, wherein the planet gears 12a of the gear set RS1a and the outer planet gears 12b" of the gear set RS1b are coupled together and the carrier 15b" of the outer planet gears 12b" is connected with the carrier 15b' of the inner planet gears 12b'. The gear set RS2 encompasses two gears sets RS2a and RS2b, whereby the planet gears 22a of the gear set RS2a and the outer planet gears 22b" of the gear set RS2b are coupled together.

The input drive shaft 1 (speed of rotation 1) is connected with the sun gear 11b of the gear set RS1b and the sun gear 21a of the gear set RS2a and by means of the shift element A can be connected with the sun gear 31 and by means of the shift element E is connectable with the internal gear 33. The sun gear 11a of the gear set RS1a is connected with the housing. The internal gear 13a of the gear set RS1a and 13b of the gear set RS1b are connected to one another (speed of rotation, n1a) and by means of the shift element B can be connected to the sun gear 41 of the second output-side gear set RS4. The sun gear 41 is blockable by the brake C. The sun gear 21b of the gear set RS2b (speed of rotation n2B) can be connected to the internal gear 33 by means of the shift element D, as well as with the sun gear 41 by means of the shift element F. The internal gear 33 is connected to the carrier 45. The carrier 25b' of the inner planet gears 22b' and 25b" of the outer planet gears 22b" of the gear set RS2b and the carrier 25a of the gear set RS2a are bound to one another (speed of rotation n1b) and can be connected to the sun gear 41 by means of the shift element H. The coupled internal gears 23a and 23b (speed of rotation n2a) of the gear sets RS2a and RS2b can, likewise, be connected to the sun gear 41 by means of the shift element G. The sun gear 43 is connected with the carrier 35 and with the output drive shaft 2.

With these described gear arrangements, the tables presented in FIG. 11B showing stall gear ratios, tell us that it is possible by closure of eight shift elements A to H, to activate sixteen forward gear positions and one reverse gear position. The advantages of this embodiment 11 of the invented multi-step transmission are to be found in the very high number of gear positions made available in a very compact installation space, with relatively a small number of planet gear sets and shift elements. By an appropriate selection of the gear ratios of the gear sets, from the embodiment 11, a multi-step transmission can be developed with two reverse gears, however in such a case, the number of forward gear positions would be reduced to fifteen.

In the following, in connection with the FIG. 12A, a multi-step transmission is discussed, which transmission possesses eight forward gear positions which are accessible through five shift elements and only one input-side gear set RS1, which is achieved in that the previously mentioned kinematic condition "speed of rotation on the shift element D is less than, or equal to the speed of rotation on the shift element B" is limited by the change, "speed of rotation on the shift element D is equal to the speed of rotation on the shift element B".

The internal gear 13 of the input-side gear set RS1 is rigidly connected by means of an axle with the housing of the multi-step transmission. The input drive shaft 1 (speed of rotation n) is connected with the sun gear 11 of the input-side gear set RS1. The said input drive shaft 1 is connectable by means of the shift element E with the internal gear 33 of the first output-side gear set RS3 as well as with the therewith connected carrier 45 of the second output-side gear set RS4. Additionally, by means of the shift element A the input drive shaft 1 can be connected to the sun gear 31 of the gear set RS3. The carrier 15 (speed of rotation n1) of the gear set RS1 is connectable with the sun gear 41 of the gear set RS4 through the shift element B and can further be connected with the internal gear 33 of the gear set RS3 by means of the shift element D. By means of the brake C, the sun gear 41 of the gear set RS4 can be immobilized. The internal gear 43 of the gear set RS4 and the therewith connected carrier 35 of the gear set RS3 are connected with the output-side shaft 2.

Figures 12A, 12B:
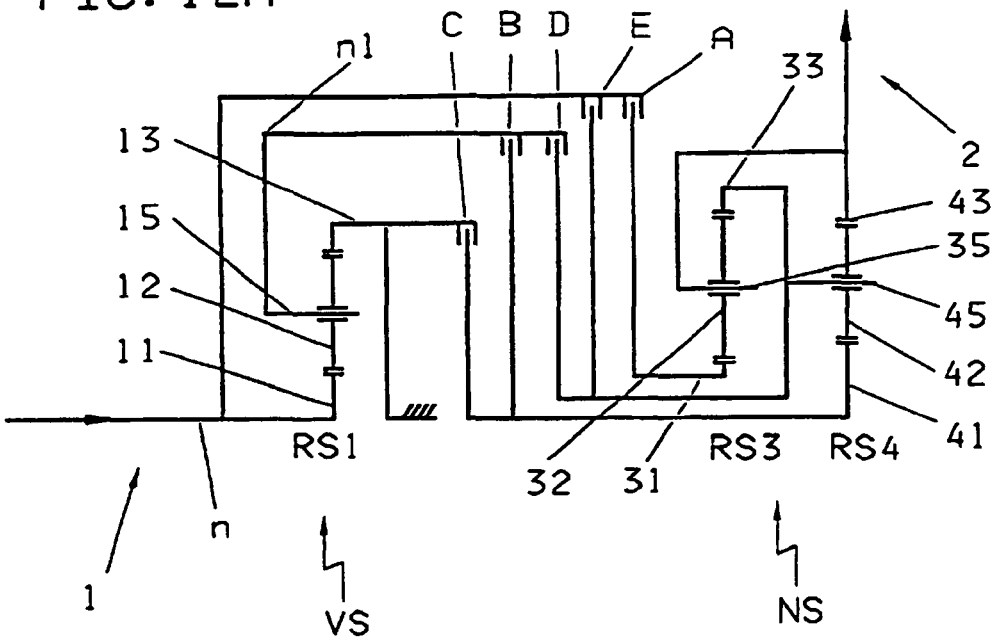
FIGS. 12A and 12B, a twelfth embodiment form of a multi-step transmission with eight forward gear positions and no reverse gear position.

With this just described transmission the possibility arises that by selective closure of the shift elements A through E, as indicated in the table of FIG. 12B, a total of eight forward gear positions are accessible.

Figures 13A, 13B:
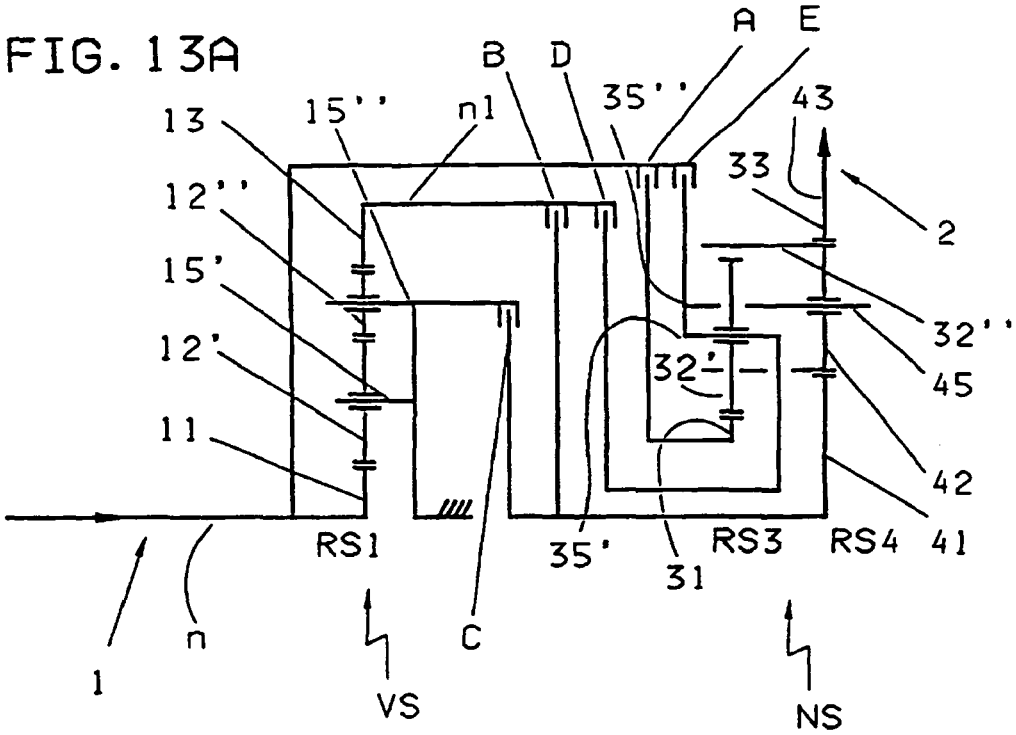
FIGS. 13A and 13B, a thirteenth embodiment form of a multi-step transmission with eight forward gear positions and no reverse gear position.

In the following, and referring to FIG. 13A, a further embodiment of an invented multi-step transmission is described, this transmission having eight forward gear positions, which are available through five shift elements.

In this transmission, likewise, a single input-side gear set RS1 is provided, which produces the necessary speed of rotation for the regulation of the output-side gear sets RS3 and RS4. The input-side gear set RS1 possesses, besides a sun gear 11 and an internal gear 13, inner planet gears 12' and outer planet gears 12", the carriers of which (15' and 15") are connected together.

The input drive shaft 1 (speed of rotation n) is connected to the sun gear 11 of the input-side gear set RS1 and can be connected with the carrier 35" of the outer planet gears 32" of the first output-side gear set RS3 by means of the shift element E, as well as connectable through the shift element A with the sun gear 31 of the gear set RS3. The carriers 15' and 15" of the gear set RS1 are affixed to the housing of the multi-step transmission. The sun gear 41 of the gear set RS4 can be blocked by the brake C. The internal gear 13 (speed of rotation n1) of the gear set RS1, by means of the shift element B, is connectable with the sun gear 41 and by means of the shift element D also connectable with the carrier 35' of the inner planet gears 32' of the gear set RS3. The carrier 35' is connected to the carrier 35" of the outer planet gears 32" of the gear set RS3 and connected also with the carrier 45 of the gear set RS4. The planet gears 32" and 42 are, in this arrangement, coupled with one another. The internal gears 33 and 43 of gear sets RS3 and RS4 are connected with the output drive shaft 2.

Figures 14A, 14B:
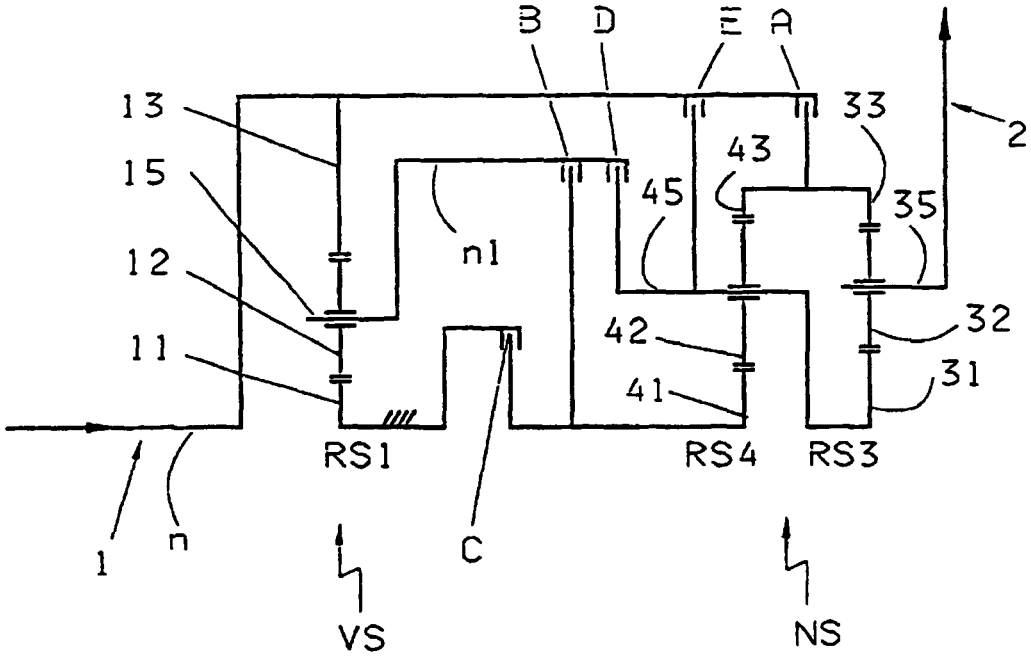
FIGS. 14A and 14B, a fourteenth embodiment form of a multi-step transmission with eight forward gear positions and no reverse gear position.

It is possible, with this described transmission, by means of selective closure of the shift elements A through E, as shown in the table of FIG. 14B, to shift through a total of eight forward gear positions.

In the following, in connection with FIG. 14B, an additional embodiment of a multi-step transmission in accord with the present invention is described, which said transmission possesses eight forward gear positions which are accessible through five shift elements, wherein, once again, only one input-side gear set is provided.

The sun gear 11 of the input-side gear set RS1 is affixed to the housing of the multi-step transmission. The input drive shaft 1 (speed of rotation n) is connected with the internal gear 13 of the gear set RS1 and by means of the shift element E can be brought into connection with carrier 45 of the second output-side gear set RS4 along with the therewith connected sun gear 31 of the first output-side gear set RS3. In like manner, through shift element A the input drive shaft 1 (speed of rotation n) can be brought into connection with the internal gear 33 of the gear set RS3 and the therewith connected internal gear 43 of the gear set RS4. The carrier 15 (speed of rotation n1) of the gear set RS1, by means of the shift element B, can be connected with the sun gear 41, and by means of the shift element B, can be connected with the sun gear 41 and by means of the shift element D connectable with the carrier 45 of the gear set RS4. Use of the brake C permits the sun gear 41 of the gear set RS4 to be made immobile. The carrier 35 of the gear set RS3 is connected to the output drive shaft 2.

By selective choice of closure of the shift elements A to E, in this described transmission, as seen in the tabulation of FIG. 14B, a total of eight forward gear positions are available.

In an advantageous manner, with the embodiments 12, 13 and 14 of the invented multi-step transmission a total of eight forward gear positions is achieved with only three sets of planetary gears and five shift elements. Especially on the account of extremely compact transmission construction and dispensing with the reverse gears, these embodiments 12, 13, and 14 are particularly appropriate for motorcycles and as a hub-shifting mechanism for bicycles. For application in a motorcycle, the gear stages of the embodiment 12 are advantageous, since in this case, the two higher gear positions exhibit a type of over-drive characteristic. For the use in bicycles the closely stepped stages in mid-range, in connection with the increasing step spread as the lower stages are approached makes the embodiments 13 and 14 particularly attractive.

In the following, in connection with the FIG. 15A, another embodiment of an invented multi-step transmission is described and explained. This embodiment possesses two, coupled, non-shiftable input-side gear sets, which enable shifting through a total of eleven forward gear positions by the selective activation of six shift elements A to F.

The second input-side gear set RS2 is designed as a plus-gear set and the first input-side gear set RS1 is designed as a minus-gear set, wherein the outer planet gears 22" of the gear set RS2 are rigidly coupled to planet gears 12 of the gear set RS1. The input drive shaft 1 (speed of rotation n) is connected to the sun gear 21 of the gear set RS2, as well as, connectable to the sun gear 41 through the shift element B and can further be connected by the shift element E to the carrier 45 of the second output-side gear set RS4, wherein the carrier 45 is connected with the internal gear 33 of the first output-side gear set RS3. The carrier 15 (speed of rotation n1) common to the outer planet gears 22" of the gear set RS2 and the planet gears 12 of the gear set RS1, can be connected to the sun gear 31 of the gear set RS3 by means of shift element A and can be connected to the sun gear 41 of the gear set RS4 through shift element F. Beyond this, the carrier 15 is connected with the carriers 25" of the outer planet gears 22" and 25' of the inner planet gears 22' of the gear set RS2. The coupled internal gears 13 and 23 (speed of rotation n2) of the gear sets RS1 and RS2 can be connected through the shift element D with the carrier 45 as well as being connected to the sun gear 41 of the gear set RS4 by means of the shift element C. The carrier 35 of the gear set RS3 is connected to the internal gear 43 of the of the gear set RS4 and with the output drive shaft 2.

Figures 15A, 15B:
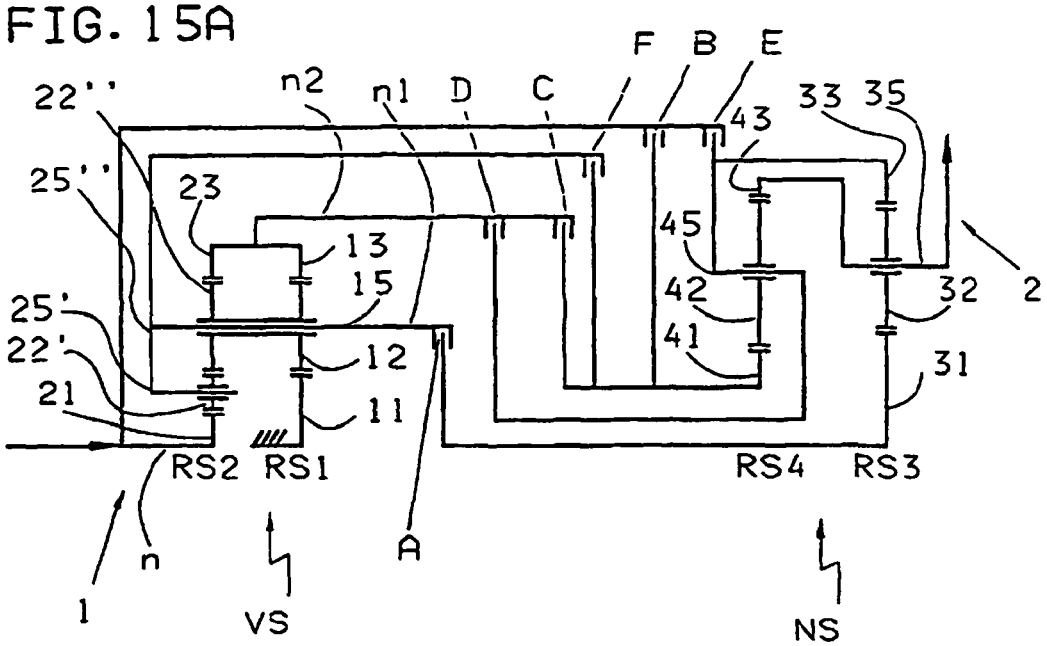
FIGS. 15A and 15B, a fifteenth embodiment form of a multi-step transmission with eleven forward gear positions and no reverse gear position.

With this multi-step transmission, by selective closure of the shift elements A to F in the manner shown in the table of FIG. 15B, shifting into eleven forward gear positions is possible.

Figures 16A, 16B:
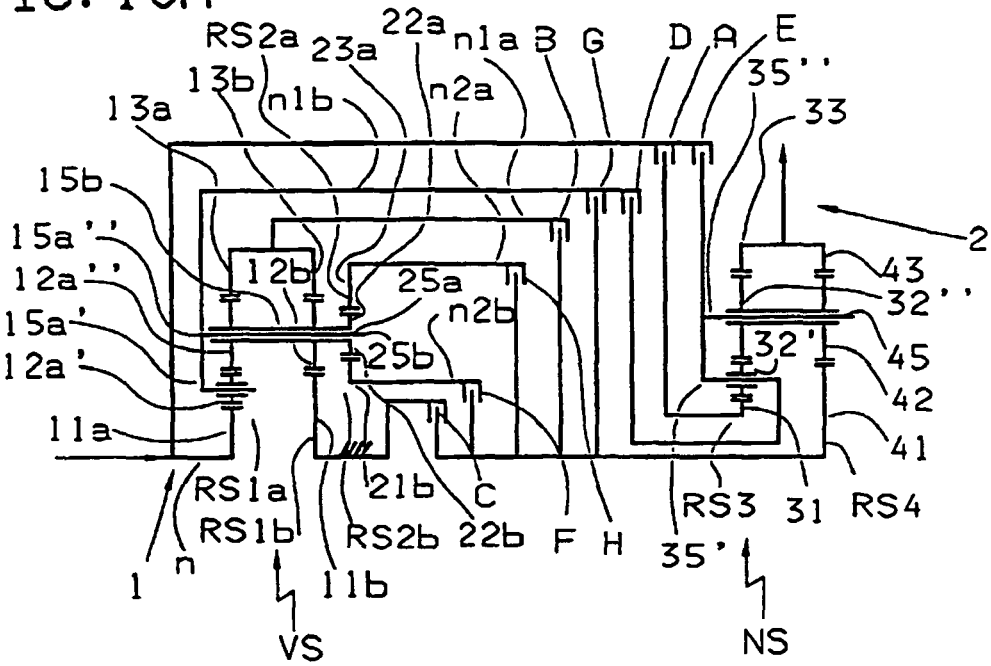
FIGS. 16A and 16B, a sixteenth embodiment form of a multi-step transmission with seventeen forward gear positions and no reverse gear position.

Finally, in connection with the FIG. 16A, yet another embodiment of the invented multi-step transmission is described, wherein, by means of eight shift elements, seventeen forward gear positions are available for shifting. Similarly to the embodiments 11A, there are provided here, all together, four coupled, non-shiftable, input-side gear sets. The input-side gear set RS1 comprises in this arrangement, a gear set RS1a and a gear set RS1b, the input-side gear set RS2 is made up of a gear set RS2a and a gear set RS2b.

The input drive shaft 1 is connected with the sun gear 11a of the first input-side gear set RS1a (plus-gear set) and can be connected to the sun gear 31 of the first output-side gear set RS3 by means of activating shift element A. Shift element E can connect the input drive shaft 1 to the carriers 35' of the inner planet gears 32' and 35" of the outer planet gears 32" of the gear set RS3 (plus-gear set). The carrier 15a' of the inner planet gears 12a" of the gear set RS1a and the carrier 15" of the outer planet gears 12" of the gear set RS1 are joined together. The gear set RS1b is designed as a minus gear train. In this arrangement, the sun gear 11b of the second input-side gear set RS1b corresponds to the sun gear 21a of the third input-side gear set RS2A. Further the internal gear 13b of the second gear set RS1b corresponds to the internal gear 23b of the fourth input-side gear set RS2b. The outer planet gears 12a" of the gear set RS1a, the planet gears 12b of the gear set RS1b, the planet gears 22a of the gear set RS2a and the planet gears 22b of the gear set RS2b are coupled together as stepping planetary gears. To these, the carrier 15a" is assigned in common. The carrier 15a" (speed of rotation n1b) is, upon activation of the shift element G, connectable with the sun gear 41 of the second output-side gear set RS4 (minus gear train) as well as, upon activation of the shift element D, connectable to the carrier 35' of the inner planet gears 32' of the first output-side gear set RS3. The gear set RS3 is designed as a plus gear train. The outer planet gears 32" of the gear set RS3 are coupled with the planet gears 42 of the gear set RS4. The carrier 35' of the inner planet gears 32' is connected to the carrier 35" of the outer planet gears 32" of the gear set RS3. The sun gear 11b of the gear set RS1b is affixed to the housing. The sun gear 21b of the gear set RS2b (speed of rotation n2b) is, by activation of the shift element F, connectable with the sun gear 41, which, by means of the brake C is likewise affixed to the housing. The internal gear 13a of the gear set RS1 and 13b of the gear set RS1b are connected together and, upon activation of the shift element B (speed of rotation n1a) are connectable to the sun gear 41. The carrier 35" and the carrier 35' are connected together with the carrier 45. The internal gear 23a of the, gear set,RS2a (speed of rotation n2a) is, through the shift element H, connectable with the sun gear 41 of the gear set RS4. Finally, the internal gears 33 and 43 are connected with the output drive shaft 2.

With the described features of the multi-step transmission, and with consideration of the table in FIG. 16B showing the stall gear ratios of the employed gear sets, by means of selective closures of the eight shift elements A through H as shown in the said FIG. 16B, a total of seventeen forward gear positions are available.

Similar to the embodiments 12, 13, 14, the described embodiments 15 and 16 of the multi-step transmissions are particularly adaptable to motorcycles and especially well suited for hub shifting for bicycles, with a corresponding high number of shift positions.

| Reference Numbers and Item Designations | |
|---|---|
| VS | Input-side planetary gear set |
| RS1 | 1st input-side planetary gear set, 1st planet gears set |
| RS1a | 1st input-side planetary gear set |
| RS1b | 2nd input-side planetary gear set |
| RS2 | 2nd input-side planetary gear set, 2nd planetary gear set |
| RS2a | 3rd input-side planetary gear set |
| RS2b | 4th input-side planetary gear set |
| NS | Output-side planetary gear set |
| RS3 | 1st output-side planetary gear set, 3rd planetary gear set |
| RS4 | 2nd output-side planetary gear set, 4th planetary gear set |
| A-H | 1st to the $8^{th}$ shifting element (shift element or brake) |
| n | Input speed of rotation of the input drive shaft |
| n1 | Output speed of rotation of the planetary gear set RS1 |
| n1a | Output speed of rotation of the planetary gear set RS1a |
| n1b | Output speed of rotation of the planetary gear set RS1b |
| n2 | Output speed of rotation of the planetary gear set RS2 |
| n2a | Output speed of rotation of the planetary gear set RS2a |
| n2b | Output speed of rotation of the planetary gear set RS2b |
| 1 | Input drive shaft |
| 2 | Output drive shaft |
| 11 | Sun gear of the gear set RS1 |
| 11a | Sun gear of the gearset RS1a |
| 11b | Sun gear of the gearset RS1b |
| 12 | Planet gears of the gear set RS1 |
| 12' | Inner planet gears of the gear set RS1 |
| 12" | Outer planet gears of the gear set RS1 |
| 12a | Planet gears of the gear set RS1a |
| 12a' | Inner planet gears of the gear set RS1a |
| 12a" | Outer planet gears of the gear set RS1a |
| 12b | Planet gears of the gear set RS1b |
| 12b' | Inner planet gears of the gear set TS1b |
| 12b" | Outer planet gears of the gear set RS1b |
| 13 | Internal gear of the gear set RS1 |
| 13a | Internal gear of the gear set RS1a |
| 13b | Internal gear of the gear set RS1b |
| 15 | Carrier of the gear set RS1 |
| 15' | Carrier of the inner planet gears of the gear set RS1 |
| 15" | Carrier of the outer planet gears of the gear set RS1 |
| 15a | Carrier of the gear set RS1a |
| 15a' | Carrier of the inner planet gears of the gear set RS1a |
| 15a" | Carrier of the outer planet gears of the gear set RS1a |
| 15b | Carrier of the gear set RS1b |
| 15b' | Carrier of the inner planet gears of the gear set RS1b |
| 15b" | Carrier of the outer planet gears of the gear set RS1b |

-continued

| Reference Numbers and Item Designations | |
|---|---|
| 21 | Sun gear of the gear set RS2 |
| 21a | Sun gear of the gear set RS2a |
| 21b | Sun gear of the gear set RS2b |
| 22 | Planet gears of the gear set RS2 |
| 22' | Inner planet gears of the gear set RS2 |
| 22" | Outer planet gears of the gear set RS2 |
| 22a | Planet gears of the gear set RS2a |
| 22b | Planet gears of the gear set RS2b |
| 22b' | Inner planet gears of the gear set RS2b |
| 22b" | Outer planet gears of the gear set RS2b |
| 23 | Internal gear of the gear set RS2 |
| 23a | Internal gear of the gear set RS2a |
| 23b | Internal gear of the gear set RS2b |
| 25 | Carrier of the gear set RS2 |
| 25' | Carrier of the inner planet gears of the gear set RS2 |
| 25" | Carrier of the outer planet gears of the gear set RS2b |
| 31 | Sun gear of the planetary gear set RS3 |
| 32 | Planet gears of the planetary gear set RS3 |
| 32' | Inner planet gears of the planetary gear set RS3 |
| 32" | Outer planet gears of the planetary gear set RS3 |
| 33 | Internal gear of the planetary gear set RS3 |
| 35 | Carrier of the planetary gear set RS3 |
| 35' | Carrier of the inner planet gears of the gear set RS3 |
| 35" | Carrier of the outer planet gears of the gear set RS3 |
| 41 | Sun gear of the gear set RS4 |
| 42 | Planet gears of the planetary gear set RS4 |
| 43 | Internal gear of the planetary gear set RS4 |
| 45 | Carrier of the planetary gear set RS4 |

What is claimed is:

1. A multi-step transmission, with an input drive shaft (1) which is connected with an input-side gear set (VS), with, an output drive shaft (2) which is connected with an output-side gear set (NS) which is comprised of two shiftable, coupled planetary gear sets (RS3, RS4), and with shift elements (A-H), whereby by chosen shifting of the said shift elements (A-H) the speed of rotation of the input drive shaft (1) and the speed of rotation of the input-side gear set (VS) are transferable selectively to the output-side gear set for the shifting of gear positions, wherein the input-side gear set (VS) is constructed of two non-shiftable, coupled planetary gear sets (RS1, RS2), whereby the two planetary gear sets (RS1, RS2) produce for their output-side two speeds of rotation (n1, n2), which, besides the input speed of rotation (n) of the input drive shaft (1), optionally, on at least one of the two shiftable planetary gear sets (RS3, RS4) of the output-side gear set (NS), which act upon the output drive shaft (23), by means of selective closure of the shift elements (A-[F] *H*) are shiftable in such a manner, that for the shifting from one gear position into the subsequent higher or lower gear position, of the two just activated shift elements, respectively only one shift element is shut off and a further shift element is activated, and in that at least at least seven forward gear positions are made available.

2. The multi-step transmission according to claim 1, wherein the number of the forward gear positions is about twice as large as the number of the shift elements (A-[F] *H*).

3. The multi-step transmission according to claim 1, wherein as an input-side gear set (VS) a first planetary gear set (RS1) and a second planetary gear set (RS2) are provided, which form a non-shiftable two carrier, four shaft, gear set, whereby at least one shaft runs with the input speed of rotation (n) of the input drive shaft (1) and a further shaft is stationary, and in that the shiftable output-side gear set (NS) is a shiftable, two carrier, four shaft gear drive, which incorporates a third planetary gear set (RS3) and a fourth planetary gear set (RS4).

4. The multi-step transmission according to claim 1, wherein the sun gear 11 of the first planetary gear set (RS1) and the sun gear (21) of the second planetary gear set (RS2) are placed on the input drive shaft (1), in that the internal gear (13) of the first planetary gear set (RS1) is rendered immobile, and in that the carrier (15) of the planetary gears (12) of the first planetary gear set (RS1) is connected with carrier (25) of the planet gears (22) of the second planetary gear set (RS2), in that the internal gear (23) of the second planetary gear set (RS2), by means of fourth shift element (D) can be connected to the internal gear (33) of the third planetary gear set (RS3), in that the internal gear (33) of the third planetary gear set (RS3) is connected to the carrier (45) of the planet gears (42) of the fourth planetary gear set (RS4), in that the carrier (15) of the first planetary gear set (RS1), by means of a first shift element (A) can be made connectable with the sun gear (31) of the third planetary gear set (RS3), in that the carrier (25) of the second planetary gear set (RS2), by means of the third shift element (C) can be made connectable with the sun gear (41) of the fourth planetary gear set (RS4), in that the carrier (35) of the planet gears (32) of the third planetary gear set (RS3) is connected with the internal gear (43) of the fourth planetary gear set (RS4) and with the output drive shaft (2), in that the input drive shaft (1), by means of a second shift element (B) can be made connectable with the sun gear (41) of the fourth planetary gear set (RS4) and by means of a fifth shift element (E) also connectable with the carrier (45) of the fourth planetary gear set (RS4) [(See FIG. 1A)].

5. The multi-step transmission according to claim 1, wherein the input drive (1) is connected to the sun gear (11) of the first planetary gear set (RS1) and to the internal gear (21) of the second planetary gear set (RS2), in that the carrier (25) of the planet gears (22) of the second planetary gear set (RS2) is rendered immobile and is connected to the internal gear (13) of the first planetary gear set (RS1), in that the input drive shaft (1), by means of a first shift element (A) is connectable with the sun gear (31) of the third planetary gear set (RS3) and by means of a fifth shift element (E) is connectable to the carrier (45) of the planet gears (42) of the fourth planetary gear set (RS4), in that the carrier (45) of the fourth planetary gear set (RS4) is connected to the internal gear (33) of the third planetary gear set (RS3), in that the carrier (45) of the fourth planetary gear set (RS4) and the therewith connected internal gear (33) of the third planetary gear set (RS3), by means of a fourth shift element (D) can be immobilized, in that the internal gear (23) of the second planetary gear set (RS2), by means of the third shift element (C) is made connectable with the sun gear (41) of the fourth planetary gear' set (RS4), in that the carrier (15) of the planet gears (12) of the first planetary gear set (RS1), by means of a second shift element (B) is made connectable with the sun gear (41) of the fourth planetary gear set (RS4) and in that the internal gear (42) of the fourth planetary gear set (RS4) is connected to the carrier (35) of the third planetary gear set (RS3) and is also connected to the output drive shaft (2) [(See FIG. 2A)].

6. The multi-step transmission according to claim 1, wherein the input drive shaft (1) is connected with the sun gear (11) of the first planetary gear set (RS1), in that the carrier (15) of the planet gears (12) of the first planetary gear set (RS1) is connected to carrier (25") of the outer planetary gear set (22") and also to the carrier (25') of the inner planet gears (22') of the second planetary gear set (RS2), in that the inner planet gears (12) of the first planetary gear set (RS1) are coupled with the outer planet gears (22') of the second planetary gear set (RS2), in that the internal gear (13) of the first planetary gear set (RS1) is connected with internal gear (23) of the second planetary gear set (RS2), in that the internal gear (13) of the first planetary gear set (RS1) is made immobile, in that the carrier (35") of the outer planet gears (32") of the third planetary gear set (RS3)is connected with the carrier (35') of the inner planet gears (32') of the third planetary gear set (RS3) and with the carrier (45) of the planet gears (42) of the fourth planetary gear set (RS4), in that the two carriers (35', 35") of the third planetary gear set (RS3) and the therewith connected carrier (45) of the fourth planetary gear set (RS4), by means of a fourth shift element (D) can be made immobile, in that the input drive shaft (1), by means of a first shift element (A) is connectable with the sun gear (31) of the third planetary gear set (RS3), in that the input drive shaft (1), by means of a fifth shift element (E) can be made connectable with the carriers (35', 35") of the third planetary gear sets (RS3) and with the therewith connected carrier (45) of the fourth planetary gear set (RS4), in that the planet gears (42) of the fourth planetary gear set (RS4) are coupled to the outer planet gears (32") of the third planetary gear set (RS3), in that the sun gear (21) of the second planetary gear set (RS2), by means of a third shift element (C) is connectable with sun gear (41) of the fourth planetary gear set (RS4), in that the carrier (15) of the first planetary gear set (RS1) and the two therewith connected carriers (25', 25") of the second planetary gear set (RS2), by means of a second shift element (B) can be made connectable with the sun gear (41) of the fourth planetary gear set (RS4) and in that the internal gear (33) of the third planetary gear set (RS3) and the thereon coupled internal gear (43) of the fourth planetary gear set (RS4) are connected with the output drive shaft (1)[, (See FIG. 3A)].

7. The multi-step transmission according to claim 1, wherein the planet gears (12) of the first planetary gear set (RS1) are coupled onto the planet gears (22) of the second planetary gear set (RS2), in that the sun gear (11) of the first planetary gear set (RS1) is made immobile, in that the carrier (15) of the planet gears (12) of the first planetary gear set (RS1) and the carrier (25) of the planet gears (22) of the second planetary gear set (RS2) are connected with one another, in that the input drive shaft (1) is connected with the internal gear (13) of the first planetary gear set (RS1) and with the internal gear (23) of the second planetary gear set (RS2), in that the sun gear (21) of the second planetary gear set (RS2), by means of a fourth shift element (D) is connectable with the carrier (45) of the planetary gears (42) of the fourth planetary gear set (RS4), in that the carrier (15) of the first planetary gear set (RS1) and the therewith connected carrier (25) of the second planetary gear set (RS2), by means of a third shift element (C) are connectable with the internal gear (43) of the fourth planetary gear set (RS4), in that the input drive shaft (1), by means of a second shift element (B) is connectable with the internal gear (43) of the fourth planetary gear set (RS4), in that the input drive shaft (1), by means of a fifth shift element (E) is connectable with the internal gear (33) of the third planetary gear set (RS3), in that the internal gear (33) of the third planetary gear (RS3) is connected to the carrier (45) of the fourth planetary gear (RS4) in that the carrier (35) of the planet gears (32) of the third planetary gear set (RS3) is connected with the output drive shaft (2) and in that the sun gear (31) of the third planetary gear set (RS3) and the sun gear (41) of the fourth planetary gear set (RS4) are bound together and by means of a first shift element (A) can be made immobile[. (See FIG. 4A)].

8. The multi-step transmission according to claim 1, wherein the input drive shaft (1) is connected with the sun gear (11) of the first planetary gear set (RS1), in that the sun gear (11) of the first planetary gear set (RS1) is connected with the sun gear (21) of the second planetary gear set (RS2), in that the internal gear (11) of the first planetary gear set (RS1) is made immobile, in that the carrier (15) of the planet gears (12) of the first planetary gear set (RS1) is connected with the carrier (25) of the planet gears (22) of the second planetary gear set (RS2), in that the internal gear (23) of the second planetary gear set (RS2), by means of a fourth shift element (D) can be connected with the carrier (45) of the fourth planetary gear set (RS4), in that the carrier (45) of the fourth planetary gear set (RS4) is connected with the internal gear (33) of the third planetary gear set (RS3), in that the input drive shaft (1), by means of a first shift element (A) is connectable with the sun gear (31) of the third planetary gear set (RS3) and the therewith connected sun gear (41) of the fourth planetary gear set (RS4), in that the input drive shaft (1), by means of a fifth shift element (E) is connectable to the carrier (45) of the fourth planetary gear set (RS4) and to the therewith coupled internal gear (33) of the third planetary gear set (RS3), in that the carrier (15) of the first planetary gear (RS1) and the therewith connected carrier element (B) is connectable with the internal gear (43) of the fourth planetary gear set (RS4), in that the internal gear (43) of the fourth planetary gear set (RS4), by means of a third shift element (C) can be made immobile, and in that the carrier connected to the output drive shaft (2)[, (See FIG. 5A)].

9. The multi-step transmission according to claim 1, wherein the input shaft drive (1) is connected with the internal gear (13) of the first planetary gear set (RS1), in that the internal gear (13) of the first planetary gear set (RS1) is connected with internal gear (23) of the second planetary gear set (RS2), in that the sun gear (11) of the first planetary gear set (RS1) is made immovable, in that the carrier (15) of the planetary gear set (12) of the first planetary gear set (RS1) is connected with the carrier (25) of the planet gears (22) of the second planetary gear set (RS2), in that the sun gear (21) of the second planetary gear set (RS2), by means of a fourth shift element (D) is connectable with the carrier (35') of the inner planet gears (32') of the third planetary gear set (RS3), in that the carrier (35') of the inner planet gear (32') of the third planetary gear set (RS3) is connected with the carrier (35") of the outer planet gears (32") of the third planetary gear set (RS3), in that the outer planet gears (32") of the third planetary gear set (RS3) are coupled with the planet gears (42) of the fourth planetary gear set (RS4), in that the carrier (25) of the second planetary gear set (RS2), by means of a first shift element (A) is connectable with the sun gear (31) of the third planetary gear set (RS3), in that the input drive shaft (1), by means of a fifth shift element (E) is connectable with the carrier (35') and with the carrier (35") of the third planetary gear set (RS3), in that the sun gear (21) of the second planetary gear set (RS2), by means of a sixth shift element (F) is connectable with the sun gear (41) of the fourth planetary gear set (RS4), in that the carrier (15) of the first planetary gear set (RS1) and the carrier (25) of the second planetary gear set (RS2), by means of a second shift element (B) are connectable with the sun gear (41) of the fourth planetary gear set (RS4), in that the sun gear (41) of the fourth planetary gear set (RS4), by means of a third shift element (C) can be made immovable, in that the internal gear (33) of the third planetary gear set (RS3) is connected to internal gear (43) of the fourth planetary gear set (RS4) and is also connected to the output drive shaft (2)[, (See FIG. 6A)].

10. The multi-step transmission according to claim 1, wherein the input drive shaft (1) is connected with the internal gear (13) of the first planetary gear set (RS1), in that the carrier (15) of the planet gears (12) of the first planetary gear set (RS1) is connected with the carrier (25) of the planet gears (22) of the second planetary gear set (RS2), in that the internal gear (13) of the first planetary gear set (RS1) is connected with the internal gear (23) of the second planetary gear (RS2), in that the sun gear (11) of the first planetary gear set (RS1) is made immobile, in that the input drive shaft (1), by means of a fifth shift element (E) is connectable with the carrier (45) of the planet gears (42) of the fourth planetary gear (RS4), which is connected to the internal gear (33) of the third planetary gear set (RS3), in that the input drive shaft (1), by means of a second shift element (B) is connectable with the sun gear (41) of the fourth planetary gear set (RS4), in that the carrier (15) of the first planetary gear set (RS1) and the carrier (25) of the second planetary gear set (RS2), by means of a first shift element (A) are connectable with the sun gear (31) of the third planetary gear set (RS3) and by means of a sixth shift element (F) are connectable with the sun gear (41) of the fourth planetary gear set (RS4), in that the sun gear (21) of the second planetary gear set (RS2), by means of a third shift element (C) is connectable with the fourth planetary gear set (RS4) and by means of a fourth shift element (D) is connectable with the carrier (45) of the fourth planetary gear set (RS4) and also with the internal gear (33) of the third planetary gear set (RS3) and in that the internal gear (43) of the sun gear (41) of the fourth planetary gear set (RS4) is connected to the carrier (35) of the planet gears (32) of the third planetary gear set (RS3) and also with the output drive shaft (2)[, (See FIG. 7A)].

11. The multi-step transmission according to claim 1, wherein the input drive shaft (1) is connected with the sun gear (21) of the second planetary gear set (RS2) and also connected with the carrier (15') of the inner planet gears (12') of the first planetary gear set (RS1), in that the carrier (15') of the inner planet gears (12') of the first planetary gear set (RS1) is connected with the carrier (15") of the outer planet gears (12") of the first planetary gear set (RS1), in that the carrier 25 of the planet gears (22) of the second planetary set (RS2) are made immobile and connected with the sun gear (11) of the first planetary gear set (RS1), in that the input drive shaft (1) by means of a first shift element (A) is connectable with the sun gear (31) of the third planetary gear set (RS3), in that the internal gear (23) of the second planetary gear set (RS2) by means of a third shift element (C) is connectable with the sun gear (41) of the fourth planetary gear set (RS4), in that the internal gear (13) of the first planetary gear set (RS1), by means of a second shift element (B) is connectable with the sun gear (41) of the fourth planetary gear set (RS4), in that the input drive shaft (1) by means of a fifth shift element (E) is made connectable with the carrier (45) of the planet gears (42) of the fourth planetary gear set (RS4), in that the carrier (45) of the fourth planetary gear set (RS4) is connected to the internal gear (33) of the third planetary gear set (RS3) and by means of a fourth shift element (D) is made immobile, in that the sun gear (41) of the fourth planetary gear set (RS4) by means of a sixth shift element (F) is made immobile and in that the carrier (43) of the fourth planetary gear set (RS4) is connected with the carrier (35) of the planet gears (32) of the third planetary gear set (RS3) as well as with the output drive shaft (2)[, (See FIG. 8A)].

12. The multi-step transmission according to claim 1, wherein the input drive shaft (1) is connected with the sun gear (21) of the second planetary gear set (RS2), in that the outer planet gears (22") of the second planetary gear set (RS2) are coupled with the planet gears (12) of the first planetary gear set (RS1), in that the sun gear (11) of the first planetary gear set (RS1) is made immobile, in that the input drive shaft (1), by means of a second shifting element (B) can be connected with the sun gear (41) of the fourth planetary gear set (RS4) and by means of a fifth shifting element (E) can be connected with the carrier (45) of the planet gears (42) of the fourth planetary gear set (RS4), which is connected with the internal gear (33) of the third planetary gear set (RS3), in that the common carrier (15) of the outer planet gears (22") of the second planetary gear set (RS2) and the planet gears (12) of the first planetary gear set (RS1) is connected with the carrier (25') of the inner planet gears (22') of the second planetary gear set (RS2) and by means of a sixth shift element (F) can be connected with the sun gear (41) of the fourth planetary gear set (RS4), in that the internal gear (13) of the first planetary gear set (RS1) is connected with the internal gear (23) of the second planetary gear set (RS2) and by means of a fourth shift element (D) can be connected with the carrier (45) of the fourth planetary gear set (RS4) and by means of a third shift element (C) can be connected with the sun gear (41) of the fourth planetary gear set (RS4), in that the common carrier (15) for outer planet gears (22') of the second planetary gear set (RS2) and the planet gears (12) of the first planetary gear set (RS1) by means of a first shift element (A) can be connected with the sun gear (31) of the third planetary gear set (RS3), and in that the internal gear (43) of the fourth planetary gears (RS4) is connected to the carrier (35) of the sun gear (32) of the third planetary gear set (RS3) and to the output drive shaft (2)[, (See FIG. 15A)].

[13. The multi-step transmission according to claim 1, wherein the input-side gear set (VS) is comprised of a non-shiftable planetary gear set (RS1), which produces on its output-side, a speed of rotation (n1), which, besides the input speed of rotation (n) of the input drive shaft, optionally can be shifted in such a manner to at least one of the two shiftable planetary gear sets (RS3, RS4) which act upon the output gear sets (NS) by means of selective closure of the shift elements (A to F), that, for the shift change from one gear into the following respective higher or lower gear of the two immediately activated shifting elements in respect to which only one shift element is open and one shift element is closed, whereby at least seven forward gears are formed and the number of the forward gears is at least greater by two than the number of the shift elements.]

[14. The multi-step transmission according to claim 13, wherein the sun gear (11) of the input-side planetary gear set (RS1) is connected with the input drive shaft (1), in that the carrier (15') of the inner planet gears (12') of the input-side planetary gear set (RS1) is made immobile and is connected to the carrier (15") of the outer planet gears (12") of the input-side planetary gear set (RS1), in that the input drive shaft (1), by means of a fifth shift element (E) is connectable with the carrier (45) of the second output-side planetary gear set (RS4), whereby the carrier (45) of the second output-side planetary gear set (RS4) is connected with the carrier (35') of the inner planet gears (32') of the second output-side planetary gear set (RS3) and with the carrier (35") of the outer planet gears (32") of the second output-side planetary gear set (RS3) and by means of a fourth shift element (D) can be immobilized, in that the input drive shaft (1), by means of a second shift element (B) can be connected with the sun gear (41) of the second output-side planetary gear set (RS4), in that the inner planet gears (12') and the carrier (15") of the outer planet gears (12") of the input-side planetary gear set (RS1), by means of a third shift element (C) are connectable with the sun gear (41) of the second output-side planetary gear set (RS4), in that the internal gear (13) of the input-side planetary gear set (RS1), by means of a sixth shift element (F) is connectable with the sun gear (41) of the second output-side planetary gear set (RS4) and by means of a first shift element (A) is connectable with the sun gear (31) of the of the first output-side planetary gear set (RS3), in that the internal gear (43) of the second output-side planetary gear set (RS4) is connected with the internal gear (33) of the first output-side planetary gear set (RS3) and with output drive shaft (2), and in that the outer planet gears (32") of the first output-side planetary gear set (RS3) and the planet gears (42) of the second output-side planetary gear set (RS4) are coupled together, (See FIG. 9A).]

[15. The multi-step transmission according to claim 13, wherein the sun gear (11) of the input-side planetary gear set (RS1) is connected with input drive shaft (1), in that the internal gear (13) of the input-side planetary gear set (RS1) is made immobile, in that the input drive shaft (1), by means of a first shift element (A) can be connected with the sun gear (31) of the first output-side planetary gear set (RS3) and by means of a fifth shift element (E) can be connected with the carrier (45) of the planet gears (42) of the second output-side planetary gear set (RS4), in that the carrier (45) of the second output-side planetary gear set (RS4) is connected with internal gear (33) of the first output-side planetary gear set (RS3), in that the carrier (45) of the second output-side planetary gear set (RS4) and the internal gear (33) of the first output-side planetary gear set (RS3), by means of a fourth shift element (D) can be connected with the carrier (15) of the planet gears (12) of the input-side planetary gear set (RS1), in that the sun gear (41) of the second output-side planetary gear set (RS4), by means of a third shift element (C) can be made immobile, in that the carrier (15) of the planet gears (12) of the input-side planetary gear set (RS1) by means of a second shift element (B) is connectable with the sun gear (41) of the second output-side planetary gear set (RS4) and in that the internal gear (43) of the second output-side planetary gear set (RS4) is connected with the carrier (35) of the planet gears (32) of the first planetary gear set (RS3) and with the output drive shaft (2), (See FIG. 12A).]

[16. The multi-step transmission according to claim 13, wherein the sun gear (11) of the input-side planetary gear set (RS1) is connected with the input drive shaft (1), in that the carrier (15') of the inner planet gears (12') and the carrier (15") of the outer planet gears (12")of the input-side planetary gear set (RS1) are connected with one another and made immobile, in that the carrier (35') of the inner planet gears (32') of the first output-side planetary gear set (RS3) is connected with the carrier (35") of the outer planet gears (32") of the first output-side planetary gear set (RS3) and is connected with the carrier (45) of the planet gears (42) of the second output-side planetary gear set (RS4), in that the connected carriers (35', 35", 45) of the first and second output-side planetary gear sets (RS3, RS4), by means of a fourth shift element (D) are connectable with the internal gear (13) of the input-side planetary gear set (RS1), in that the input drive shaft (1), by means of a first shift element (A) is connectable with the sun gear (31) of the first output-side planetary gear set (RS3), in that the input drive connected carrier ( 35", 35', 45) of the first and second output-side planetary gear set (RS3, RS4), in that the sun gear (41) of the second output-side planetary gear set (RS4), by means of a third shift element (C) can be made immobile, in that the internal gear (13) of the input-side planetary gear set, by means of second shift element (B) is connectable with the sun gear (41) of the second output-side planetary gear set (RS4) and in that the internal gear (33) of the first output-side planetary gear set (RS) and the first output-side planetary gear set (RS3) and the internal gear (43) coupled thereto of the second output-side planetary gear set (RS4) are connected with the output drive shaft (2), (See FIG. 13A).]

[17. The multi-step transmission according to claim 13, wherein the internal gear (13) of the input-side planetary gear set (RS1) is connected with the input drive shaft (1), in that the sun gear (11) of the input-side planetary gear set (RS1) is made immobile, in that the input drive shaft (1) by means of a fifth shift element (E) is connectable with the carrier (45) of the planet gears (42) of the second output-side planetary gear set (RS4), whereby the carrier (45) is connected with the sun gear (31) of the first output-side planetary gear set (RS3) and by means of a first shift element (A) is connectable with the internal gear (33) of the first output-side planetary gear set (RS3), whereby the internal gears (33, 43) of the first and second output-side planetary gear sets (RS3, RS4) are connected to one another and whereby the carrier (15) of the input-side planetary gear set (RS1), by means of a second shift element (B) is connectable with the sun gear (41) of the second output-side planetary gear set (RS4) and by means of a fourth shift element (D) is connectable with the carrier (35) of the planet gears (32) of the first output-side planetary gear set (RS3) is connected with the output drive shaft (2), (See FIG. 14A).]

[18. The multi-step transmission according to claim 1, wherein the input-side gear set (VS) is comprised of three non-shiftable, coupled planetary gear sets (RS1, RS2a, RS2b), whereby the three said planetary gear sets (RS1, RS2a, RS2b) produce as output three speeds of rotation (n1, n2, n2b) besides the input speed of rotation (n) of the input drive shaft (1). These are optionally shiftable by selective closure of the shift elements (A to G) into at least one of the two shiftable planetary gear sets (RS3, RS4) of the output-side gear set (NS) which act on the output drive shaft (2) in such a manner, that for shifting from one gear into the next following higher or lower gear of the two just activated shift elements, respectively, in each case only one shift element closes and an additional shift element opens and in that at least seven forward gears are formed.]

[19. The multi-step transmission according to claim 18, wherein the number of the forward gears is at least greater by 2 than the number of the shift elements (A to G).]

[20. The multi-step transmission according to claim 18, wherein as an input-side gear set (VS), a first input-side planetary gear set (RS1), a second input-side planetary gear set (RS2a) and a third input-side planetary gear set (RS2b) are provided, which forms a non-shiftable, three-carrier, five-shaft gear train, wherein at least one shaft runs with the input speed of rotation (n) of the input drive shaft (1) and at least one further shaft is stationary, and in that the output-side gear set (NS) is a shiftable two-carrier, four-shaft gear set, which encompasses a first output-side planetary gear set (RS3) and a second output-side planetary gear set (RS4).]

[21. The multi-step transmission according to claim 18, wherein the first input-side planetary gear set (RS1) is connected with the input drive shaft (11), in that the outer planet gears (22b") of the third input-side planetary gear set (RS2b) and the planetary gears (22a) of the second input-side planetary gear set (22a) of the second input-side planetary gear side (RS2a) are coupled with one another, in that the common carrier (25b") of the planet gears (22a) of the second input-side planetary gear set (RS2a) and the outer planet gears (22b") of the third input-side planetary gear set (RS2b) is connected with the carrier (25b') of the inner planet gears (22b') of the third input-side planetary gear set (RS2b) and with the carrier (15) of the planetary gears (12) of the first input-side planetary gear set (RS1), in that the internal gear (13) of the first input-side planetary gear set (RS1) and the sun gear (21b) of the third input-side planetary gear set (RS2b) are made immobile, in that the internal gear (23a) of the second input-side planetary gear set (RS2a) and the internal gear (23b) of the third input-side planetary gear set (RS2b) by means of a fourth shift element (D) are made connectable with the carrier (45) of the planet gears (42) of the second output-side planetary gear set (RS4), in that the carrier (45) of the second output-side planetary gear set (RS4) is connected with the internal gear (33) of the first output-side planetary gear set (RS3), in that the internal gear (23a) of the second input-side planetary gear set (RS2) and the internal gear (23b) of the third input-side planetary gear set (RS2b), by means of a sixth shift element (F) is connectable with the internal gear (43) of the second output-side planetary gear set (RS4), in that the input drive shaft (1), by means of a first shift element (A) can be connected with the sun gear (41) of the second output-side planetary gear set (RS4) and with the therewith connected sun gear (31) of the first output-side planetary gear set (RS3), and by means of a fifth shift element (E) can be connected with the carrier (45) of the second output-side planetary gear set (RS4), in that the internal gear (43) of the second output-side planetary gear set (RS4), by means of a third shift element (C) is made immobile, the sun gear (21a) of the second input-side radial gear set (RS2), by means of a second shift element (B) is connectable with the internal gear (43) of the second output-side planetary gear set (RS4), which the common carrier (25b") of the planet gears (22a) of the second input-side planetary gear set (RS2a) and the outer planet gears (22b") of the third input-side planetary gear set (RS2b) by means of a seventh shift element (G) is connectable with the internal gear (43) of the second output-side planetary gear set (RS4) and the carrier (35) of the planet gears (32) of the first output-side planetary gear set (RS3) is connected with the output drive shaft (2), (See FIG. 10A).]

[22. The multi-step transmission according to claim 1, wherein the input gear set (VS) is comprised of at least four, non-shiftable, coupled planetary gear sets (RS1a, RS1b, RS2a, RS2b), which, deliver on their output-side four speeds of rotation (n1a, n1b, n2a, n2b), which, besides the input rotary speed (n) of the input drive (1), optionally, on at least one of the two shiftable output-side planetary gear sets (RS3, RS4) which act on the output drive shaft (2) of the output gear set (NS), by means of selective closure of the shift elements (A to H) are shiftable in such a manner, that for a shift change from one gear into the next contiguous higher or lower gear of the two just activated shift elements, respectively, only one shift element is closed and another shift element is open, and that at least seven forward gears are formed.]

[23. The multi-step transmission according to claim 22, wherein the number of the forward gears is at least about two greater that is the number of the shift elements (A to H).]

[24. The multi-step transmission according to claim 22, wherein as an input-side gear set (VS) a first input-side planetary gear set (RS1a), a second input-side planetary gear set (RS1b), a third input-side planetary gear set (RS2a) and a fourth input-side planetary gear set (RS2b) are provided, which form a non-shiftable gear drive which possesses four carriers and six shafts, wherein at least one shaft with the input speed of rotation (n) of the input drive shaft (1) runs, and at least one of the additional shafts is made immobile, and in that the shiftable output gear set (NS) is a shiftable two-carrier, four shaft drive, which encompasses a first output-side planetary gear set (RS3) and a second output-side planetary gear set (RS4).]

[25. The multi-step transmission according to claim 22, wherein the planet gears (12a) of the first input-side planetary gear set (RS1a) are coupled with the outer planet gears (12b") of the second input-side planetary gear set (RS1b), whereby the common carrier (15b") of the planet gears (12a) of the first input-side planetary gear set RS1a and the outer planet gears (12b") of the second input-side planetary gear set (RS1b) is connected with the carrier (15b') of the inner planet gears (12b') of the second input-side planetary gear (RS1b), in that the planet gears 22a of the third input-side planetary gear set (RS2a) are coupled with the outer planet gears (22b") of the fourth input-side planetary gear set (RS2b), whereby the common carrier (25b") of the planet gears (22a) of the third input-side planetary gear set (RS2a) and the outer planet gears (22b") of the fourth input-side planetary gear set (RS2b) is connected with the carrier (25b') of the inner planet gears (22b') of the fourth input-side planetary gear set (RS2b) and is also connected to the common carrier (15b") for the planet gears (12a) of the first input-side planetary gear set (RS1a) and the outer planet gears (12b") of the second input-side planetary gear set (RS1b), in that the input drive shaft (1) is connected with the sun gear (11b) of the second input-side planetary gear set (RS1b) and with the sun gear (21a) of the third input-side planetary gear set (RS2a), in that the sun gear (11a) of the first input-side planetary gear set (RS1a) is made immobile, in that the internal gear (13a) of the first input-side planetary gear set (RS1a) is connected with the internal gear (13b) of the second input-side planetary gear set (RS1b) and by means of a second shift element (B) can be connected with the sun gear (41) of the second output-side planetary gear set (RS4), in that the input drive shaft (1) by means of a first shift element (A) is connectable with sun gear (31) of the first output-side planetary gear set (RS3) and by means of a fifth shift element (E) can be connected with the internal gear (33) of the first output-side planetary gear set (RS3), which is connected with the carrier (45) of the planet gears (42) of the second output-side planetary gear set (RS4), in that the sun gear (21b) of the fourth input-side planetary gear set (RS2b), by means of a first shift element (D) is connectable with the internal gear (33) of the first output-side planetary gear set (RS3) and with the carrier (45) of the second output-side planetary gear set (RS4) and by means of a sixth shift element (F) is connectable with the sun gear (41) of the second output-side planetary gear set (RS4), in that the carrier (25") of the outer planet gears (22") of the fourth input-side planetary gear set (RS2b), by means of an eighth shifting element (H) is connectable with the sun gear (41) of the second output-side planetary gear set (RS4), in that the internal gear (23a) of the third input-side planetary gear set (RS2b) is connected with the internal gear (23b) of the fourth input-side planetary gear set (RS2b) and by means of a seventh shift element (G) is connectable with the sun gear (41) of the second output-side planetary gear set (RS4), in that the sun gear (41) of the second output-side planetary gear set (RS4), by means of a third shift element (C) can be immobilized and in that the carrier (35) of the planet gears (32) of the first output-side planetary gear set (RS3) is connected with the internal gear (43) of the second output-side planetary gear set (RS4) and is also connected with the output drive shaft (2), (See FIG. 11A).]

[26. The multi-step transmission according to claim 22, wherein the input drive shaft (1) is connected with the sun gear (11a) of the first input-side planetary gear set (RS1a) in that the outer planet gears (12a") of the first input-side planetary gear set (RS1a), the planet gears (12b) of the second input-side planetary gear set (RS1b), the planet gears (22a) of the third input-side planetary gear set (RS2a) and the planet gears (22b) of the fourth input-side planetary gear set (RS2a) are constructed as a stepped planet gear, in that the carrier (15a') of the inner planet gears (12a') of the first input-side planetary gear set (RS1a) is connected with the carrier (15a") of the outer planet gears (12a") of the first input-side planetary gear set (RS1a), with the carrier (15b) of the planet gears (12b) of the second input-side planetary gear set (RS1b), with the carrier (25a) of the planet gears (22a) of the third input-side planetary gear set (RS2a) and with the carrier (25b) of the planet gears (22b) of the fourth input-side planetary gear set (RS2b), and by means of a seventh shift element (G) is connectable with the sun gear (41) of the second output-side planetary gear set (RS4), in that the sun gear. (11b) of the second input-side planetary gear set (RS1B) is made immobile, in that the sun gear (41) of the second output-side planetary gear set (RS4) by means of a third shift element be made immobile, in that the internal gear (23a) of the third input-side planetary gear set (RS2a) by means of an eighth shift element (H) is connectable with the sun gear (41) of the second output-side planetary gear set (RS4), in that the input drive shaft (1) by means of a first shift element (A) is connectable with the sun gear (31) of the first output-side planetary gear set (RS3), in that the internal gear (13a) of the first input-side planetary gear set (RS1a) and the internal gear (13b) of the second input gear side planetary gear set RS1b) are connected with one another and by means of a second shift element (B) are connectable with the sun gear (41) of the second output-side planetary gear set (RS4), in that the connected carriers (15a", 15a') of the outer and inner planet gears (12a", 12a') of the first input-side planetary gear set, by means of a fourth shift element D are connectable with the carrier (35') of the inner planet gears (32') of the first output-side planetary gear set (RS3), in that the outer planet gears (32") of the first output-side planetary gears (RS3) and the planet gears (42) of the second output planetary gear set (RS4) are coupled together, in that the carrier (35") of the outer planet gears (32") of the first output-side planetary gear set (RS3) is connected with the carrier (35') of the inner planet gears (32') of the first output-side planetary gear set (RS3) and the carrier (45) of the planet gears (42) of the second output-side planetary gear set (RS4), and by means of a fifth shift element (E) is connectable with the input drive shaft (1), in that the sun gear (21b) of the fourth input-side planetary gear set (RS2b), by means of a sixth shift element (F) is connectable with the sun gear (41) of the second output-side planetary gear (RS4) and in that the internal gear (33) of the first output-side planetary gear set (RS3) and the internal gear (43) of the second output-side planetary gear set (RS4) are connected in common with the output drive shaft (2), (See FIG. 16A).]

* * * * *